United States Patent
Kashima et al.

(10) Patent No.: US 6,295,081 B1
(45) Date of Patent: Sep. 25, 2001

(54) RECORDING MEDIUM DISCHARGE APPARATUS AND IMAGE FORMING APPARATUS EQUIPPED WITH RECORDING MEDIUM DISCHARGE APPARATUS

(75) Inventors: Hiroyuki Kashima; Kazumasa Makino; Kazuhiko Takagi, all of Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/283,588

(22) Filed: Apr. 1, 1999

(30) Foreign Application Priority Data

Apr. 3, 1998 (JP) .................................................. 10-091108
Mar. 12, 1999 (JP) .................................................. 11-067019

(51) Int. Cl.⁷ .............................. B41J 2/435; B65H 39/00
(52) U.S. Cl. ........................ 347/262; 347/264; 271/290; 271/3.17
(58) Field of Search .................................... 347/262, 264; 271/279, 290, 292, 293, 3.17, 305; 493/10; 399/397, 404, 405, 21; 250/559.4, 559.3

(56) References Cited

U.S. PATENT DOCUMENTS

| 4,203,587 | * | 5/1980 | Kishi et al. ........................... 271/293 |
| 4,227,683 | * | 10/1980 | Spangler et al. ........................ 493/10 |
| 5,141,222 | * | 8/1992 | Sawada et al. ........................ 271/292 |
| 5,319,216 | * | 6/1994 | Mokuo et al. ....................... 250/559.4 |
| 5,505,442 | | 4/1996 | Chang et al. ......................... 271/298 |
| 5,630,578 | | 5/1997 | Naramore et al. .................... 271/298 |
| 5,632,479 | | 5/1997 | Kubota et al. ........................ 271/298 |
| 5,810,353 | | 9/1998 | Baskette et al. ...................... 271/305 |
| 5,963,754 | * | 10/1999 | Itoh et al. ............................... 399/21 |
| 6,142,469 | | 11/2000 | Nanbe et al. ......................... 271/288 |

* cited by examiner

*Primary Examiner*—N. Le
*Assistant Examiner*—Hai C. Pham
(74) *Attorney, Agent, or Firm*—Oliff & Berridge PLC

(57) ABSTRACT

A recording medium discharge apparatus includes bins for storing sheets of paper therein. The apparatus also includes level sensors for each detecting one of the bins having been filled with paper sheets. Each sensor consists of a light emitter and a light receiver, which are positioned on both sides of the associated bin. The emitter and the receiver are aligned on a line extending across the direction in which paper sheets can be discharged. This prevents paper sheets from coming into direct contact with the sensors. Even if paper sheets discharged into each bin are once taken out and then returned to it, the returned sheets do not come in contact with the associated sensor. It is therefore possible to keep the discharge of paper sheets in good condition.

15 Claims, 17 Drawing Sheets

RECORDING MEDIUM DISCHARGE APPARATUS AND IMAGE FORMING APPARATUS EQUIPPED WITH RECORDING MEDIUM DISCHARGE APPARATUS

BACKGROUND OF THE INVENTION

1. Field of the Invention

The present invention relates to a recording medium discharge apparatus, and image forming apparatus equipped with a recording medium discharge apparatus. In particular, the invention relates to a recording medium discharge apparatus mounted on an image forming apparatus, such as a printer, to receive, sort and store recording media such as sheets of paper. The invention also relates to an image forming apparatus fitted with such a discharge apparatus, and to an image forming apparatus which can be fitted with such a discharge apparatus.

2. Description of Related Art

Recording medium discharge apparatuses has have been known which receive, sort and store recording media such as paper sheets discharged from an image forming apparatus such as a copying machine, a printer, or a facsimile machine. In general, a recording medium discharge apparatus of this type includes bins in which paper sheets can be stacked and a means for conveying to the bins the paper sheets discharged from the image forming apparatus. The conveyed sheets are sorted and stored in the bins.

A level detector or sensor is provided for each bin to detect it being filled with paper sheets. The detector includes a lever or arm, which may be supported near the paper discharge port of the discharge apparatus. The lever can swing or pivot across the direction in which paper sheets can be discharged. The lever is urged for contact with the top one of the sheets stacked in the bin. The detector also includes a sensor for detecting the position of the lever. The detected lever position determines whether or not the stacked sheets have reached a predetermined height or level.

Each bin may be used like a mailbox allotted to a specified user. When paper sheets are stacked to a certain height in one of the bins, a user may unfortunately take out the sheets which are to allotted to another user. Finding that the sheets are for another user, this user may put them back in the bin. Once the sheets are taken out, the detector lever of the bin turns downward. If the sheets are returned into the bin, their rear ends push the lever toward the discharge port, preventing the lever from leaving the downward position. As a result, the lever blocks the port, which will then be jammed with the next sheet being discharged.

SUMMARY OF THE INVENTION

In view of the foregoing disadvantage, it is an object of the invention to provide a recording medium discharge apparatus which is never jammed with a paper sheet even if the paper sheet discharged to a bin of the apparatus is once taken out and then returned to the bin. It is another object to provide an image forming apparatus equipped with such a discharge apparatus. It is still another object to provide an image forming apparatus which can be equipped with such a discharge apparatus.

In accordance with a first aspect of the invention, a recording medium discharge apparatus is provided which includes:

an introducing section for receiving recording media on which images are formed;

a plurality of storing units for storing therein the media received from the introducing section;

discharging units for discharging to the respective storing units the media received from the introducing section;

a transporter for transporting to the discharging units the media received from the introducing section;

transport direction switches for switching the recording medium transport direction to transport selectively to the respective discharging units the media received from the introducing section; and storage amount detectors for each storage unit detecting a predetermined amount of recording media stored in each respective storing unit.

Each of the storage amount detectors includes a light emitter for emitting light and a light receiver for receiving the light from the emitter. The emitter and the receiver are provided on opposite sides of the media discharged to the associated storing unit. The emitter and the receiver are positioned on a line extending perpendicular to the direction in which the media are discharged to the storing unit. This prevents the storage amount detectors from contacting recording media directly.

There may be a case where the recording media discharged into one of the storing units are once taken out and then returned to the unit. Even in this case, the returned media do not come into contact with the associated storage amount detector. This prevents the returned media from interfering with the detector so that the next recording medium is hindered from being discharged, as is the case with the conventional storage amount detector.

The storing units may be mounted removably. The removable storing units may normally be mounted for use as mailboxes or a sorter for sorting recording media. One or some of the storing units may be removed to provide a space or spaces for storing more recording media in another or other storing units, which may be used as a stacker or stackers for stacking more recording media therein.

The light emitters and receivers of the storage amount detectors may be positioned alternately.

If all the light emitters were positioned on one side of the apparatus and all the light receivers were positioned on the other, the receiver of one of two adjacent storage amount detectors might receive, in addition to light from the associated emitter, light from the emitter of the other detector. In this case, particularly, if one of the storing units is removed, there is a high possibility that erroneous detection is made between the storage amount detectors which the removed unit shut off from each other.

If the light emitters and receivers alternate, the receiver for one of two adjacent storing units detects no light from the emitter for the other. Therefore, particularly in a case where one or some of the storing units are removed, it is possible to prevent erroneous detection of the storage amount detectors.

This discharge apparatus may further include recording medium contacting devices for each storage unit temporarily blocking off the light from the light emitter of one of the storage amount detectors by contacting a recording medium being discharged by the associated discharging unit.

When each of the discharging units discharges a recording medium to the associated storing unit, the medium comes into contact with the associated recording medium contacting device. Then, the contacting device operates to temporarily block off the light directed from the light emitter to the light receiver. Consequently, every time a recording medium is discharged to the storing unit, the contacting device operates to temporarily block off the light directed from the emitter to the receiver.

Each of the storage amount detectors may include a guide for guiding the light from the associated light emitter to the associated light receiver.

Each of the storage amount detectors may include a light modulator for modulating light emitted from the associated light emitter and a light modulation detector for detecting the modulated light. The emitter emits the light modulated by the modulator. The modulated light is received by the associated light receiver and detected by the modulation detector.

The light modulator may modulate transfer data for the associated storing unit. In this case, each of the storage amount detectors emits and receives light based on the transfer data for the associated storing unit. Therefore, even if the light receiver for one of two adjacent storing units receives light from the light emitter for the other, the light is detected distinctively as light for the other unit.

The light emitters may emit light of a wavelength which is greater than a predetermined wavelength. The light receivers may receive only light of a wavelength which is longer than this wavelength.

In accordance with a second aspect of the invention, an image forming apparatus is provided which includes an image forming unit for forming images on recording media and a recording medium discharge apparatus. The discharge apparatus includes:

an introducing section for receiving the media from the image forming unit;

a plurality of storing units for storing therein the media received from the introducing section;

discharging units for discharging the media received from the introducing section to the respective storing units;

a transporter for transporting the media received from the introducing section to the discharging units;

transport direction switches for switching the recording medium transport direction to transport the media received from the introducing section selectively to the respective discharging units; and storage amount detectors for each storage unit detecting a predetermined amount of recording media stored in each respective storing unit.

Each of the storage amount detectors includes a light emitter for emitting light and a light receiver for receiving the light from the emitter. The emitter and the receiver are provided on opposite sides of the media discharged to the associated storing unit. The emitter and the receiver are positioned on a line extending perpendicular to the direction in which the media are discharged to the storing unit. This prevents the storage amount detectors from contacting recording media directly.

There may be a case where the recording media discharged into one of the storing units are once taken out and then returned to the unit. Even in this case, the returned media do not come into contact with the associated storage amount detector. This prevents the returned media from interfering with the detector so that the next recording medium is hindered from being discharged, as is the case with the conventional storage amount detector.

The image forming apparatus may further include a storage amount judging device. If the light receiver receives no light for a predetermined time while the emitter is lit, the judging device judges that the predetermined amount of recording media is stored in the associated storing unit.

The recording medium discharge apparatus of the image forming apparatus may further include recording medium contacting devices for each temporarily blocking off the light from the emitter of one of the storage amount detectors by contacting a recording medium being discharged by the associated discharging unit. The image forming apparatus may further include a jamming detector for detecting jamming of recording media in accordance with the operation of the contacting devices.

When each of the discharging units discharges a recording medium to the associated storing unit, the medium comes into contact with the associated recording medium contacting device. Then, the contacting device operates to temporarily block off the light directed from the associated light emitter to the associated light receiver. In accordance with the operation of the contacting device, the jamming detector can detect any jamming of a recording medium.

In this case, the image forming apparatus may further include an introduction detector for detecting a recording medium received in the introducing section. If the light being received by the light receiver of each storage amount detector is not blocked off by the associated recording medium contacting device for a predetermined time after the introduction detector detects a recording medium while the associated light emitter is lit, the jamming detector judges the medium jamming.

Thus, if the light being received by the receiver is not blocked off by the recording medium contacting device for a predetermined time after the introduction detector detects a recording medium having just been received in the introducing section, the jamming detector judges the medium jamming.

In accordance with a third aspect of the invention, an image forming apparatus is provided which includes an image forming unit for forming images on recording media and a recording medium discharge apparatus. The discharge apparatus includes:

an introducing section for receiving the media from the image forming unit;

a plurality of storing units for storing therein the media received from the introducing section;

discharging units for discharging the media received from the introducing section to the respective storing units;

a transporter for transporting the media received from the introducing section to the discharging units;

transport direction switches for switching the recording medium transport direction to transport the media received from the introducing section selectively to the respective discharging units; and storage amount detectors for each detecting a predetermined amount of recording media stored in one of the storing units.

Each of the storage amount detectors includes a light emitter for emitting light and a light receiver for receiving the light from the emitter. The emitter and the receiver are provided on opposite sides of the media discharged to the associated storing unit. The emitter and the receiver are positioned on a line extending perpendicular to the direction in which the media are discharged to the storing unit.

This image forming apparatus further includes a storage amount judging device. If the light receiver receives no light for a predetermined time while the emitter is lit, the judging device judges that the predetermined amount of recording media is stored in the associated storing unit.

The recording medium discharge apparatus of this image forming apparatus may further include recording medium contacting devices for each temporarily blocking off the light from the emitter of one of the storage amount detectors by contacting a recording medium being discharged by the associated discharging unit. The image forming apparatus may further include a jamming detector for detecting jamming of recording medium in accordance with the operation of the contacting devices.

When each of the discharging units discharges a recording medium to the associated storing unit, the medium comes into contact with the associated recording medium contacting device. Then, the contacting device operates to temporarily block off the light directed from the associated light emitter to the associated light receiver. In accordance with the operation of the contacting device, the jamming detector can detect any jamming of a recording medium.

In this case, the image forming apparatus may further include an introduction detector for detecting a recording medium received in the introducing section. If the light being received by the light receiver of each storage amount detector is not blocked off by the associated recording medium contacting device for a predetermined time after the introduction detector detects a recording medium while the associated light emitter is lit, the jamming detector judges the medium jamming.

Thus, if the light being received by the receiver is not blocked off by the recording medium contacting device for a predetermined time after the introduction detector detects a recording medium having just been received in the introducing section, the jamming detector judges the medium jamming.

DESCRIPTION OF THE PREFERRED EMBODIMENTS

Figure 1:
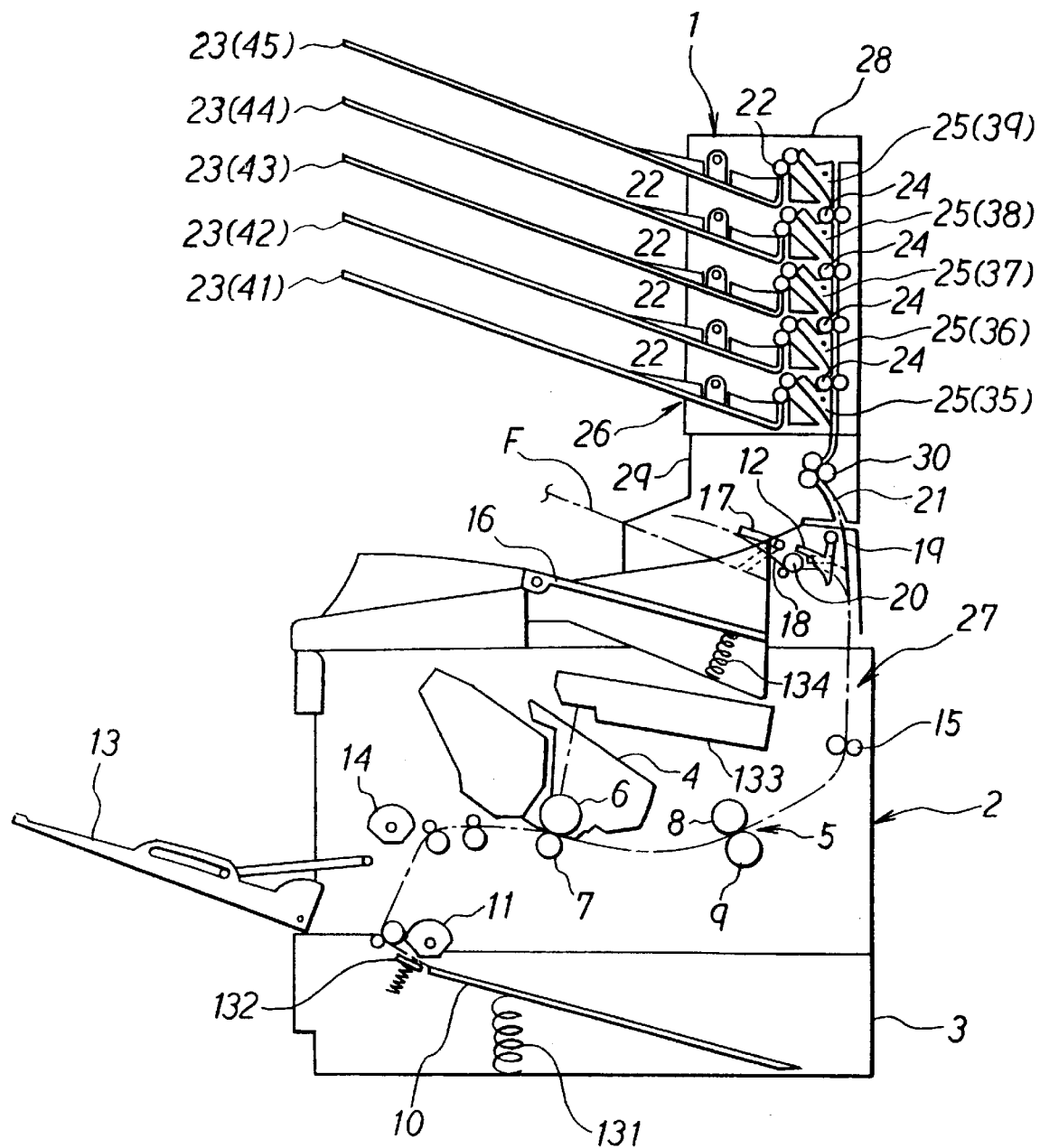
FIG. 1 shows a cross-sectional side view of main components illustrating an embodiment of a laser printer as an image-forming apparatus provided with the paper sheet discharge apparatus of the present invention.

FIG. 1 shows a cross-sectional side view of main components illustrating an embodiment of a laser printer 2 as an image-forming apparatus provided with a paper sheet discharge apparatus 1 of the present invention.

With reference to FIG. 1, a paper sheet cassette 3 for accommodating paper sheets as recording media in a stacked state is provided under the laser printer 2. The paper sheet cassette 3 is provided with a receiving plate 10 for receiving the paper sheets in the stacked manner and a spring 131 for urging the receiving plate 10 upwardly. A transport roller 11 and a friction separator pad 132, which are used to separate and feed, one by one, the paper sheets stacked on the receiving plate 10, are provided in the vicinity of one end of the receiving plate 10. The paper sheets, which are stacked in the cassette 3, are transported toward an image-forming unit 4 as described later on.

The image-forming unit 4 for forming a toner image is arranged downstream of the paper sheet cassette 3 in the transport direction of the paper sheet. A fixing unit 5 for fixing the toner transferred to the paper sheet is arranged downstream of the image-forming unit 4. The image-forming apparatus is constituted by the image-forming unit 4 and the fixing unit 5.

The image-forming unit 4 comprises the photosensitive member-equipped drum 6, an unillustrated developing unit, an unillustrated charging unit, and other components. After charging the photosensitive member-equipped drum 6, the electrostatic latent image, which is formed by exposure and scanning with the laser scanner 133, is developed with the toner to form the toner image. A transfer roller 7 for transferring the toner image formed on the photosensitive member-equipped drum 6 onto the paper sheet is provided under the photosensitive member-equipped drum 6. On the other hand, the fixing unit 5 comprises a heating roller 8 and a pressing roller 9 which is arranged in opposition to the heating roller 8. The paper sheet, which is transported from the cassette 3, is fed to the space between the photosensitive member-equipped drum 6 and the transfer roller 7 of the image-forming unit 4 to transfer the toner image thereon. After that, the paper sheet is fed to the space between the heating roller 8 and the pressing roller 9 of the fixing unit 5 to fix the transferred toner image. The paper sheet is then fed to the discharge unit 27 described below.

A discharge unit 27 for discharging the paper sheets is provided downstream of the fixing unit 5 in the paper sheet transport direction. The discharge unit 27 comprises discharge rollers 15 for discharging the paper sheets, a discharge tray-side guide passage 18 for discharging the paper sheets discharged from the discharge rollers 15 toward a discharge tray 16 described below, and an introducing passage-side guide passage 19 for discharging the paper sheets toward an introducing section of the paper sheet discharge apparatus 1 described later on.

The discharge tray 16, which serves as a receiving section for receiving the paper sheets discharged by the discharge rollers 15 and stacking the paper sheets in a stacked manner, is provided on the downstream side of the discharge tray-side guide passage 18. The discharge tray 16 is provided in a recess formed at an upper portion of the laser printer 2. A downstream end of the discharge tray 16 in the sheet feeding direction is rotatably supported, and an upstream end thereof is urged upwardly by a spring 134. When the paper sheets are stacked, the discharge tray 16 is gradually rotated downwardly as its weight is increased. Accordingly, it is possible to stack a large amount of paper sheets in an aligned state. A discharge tray level sensor 17 for detecting the fact that the capacity of the discharge tray 16 is filled with the stacked paper sheets, i.e., the full level, is attached to a downstream upper portion of the discharge tray 16. The discharge tray level sensor 17 has a detecting tab which is rotatably movable. The discharge tray level sensor 17 detects the full level if the paper sheets are stacked up to a position indicated by a phantom line F, the detecting tab abuts against the upper surface of the paper sheet, and the detecting tab ceases to make rotation downwardly beyond the position indicated by the phantom line.

An uncurling roller 20 for removing warpage of the paper sheet is provided in the discharge tray-side guide passage 18. The laser printer 2 is provided with a manual feed tray 13 and a transport roller 14 for transporting the paper sheet placed on the manual feed tray 13.

Figure 2:
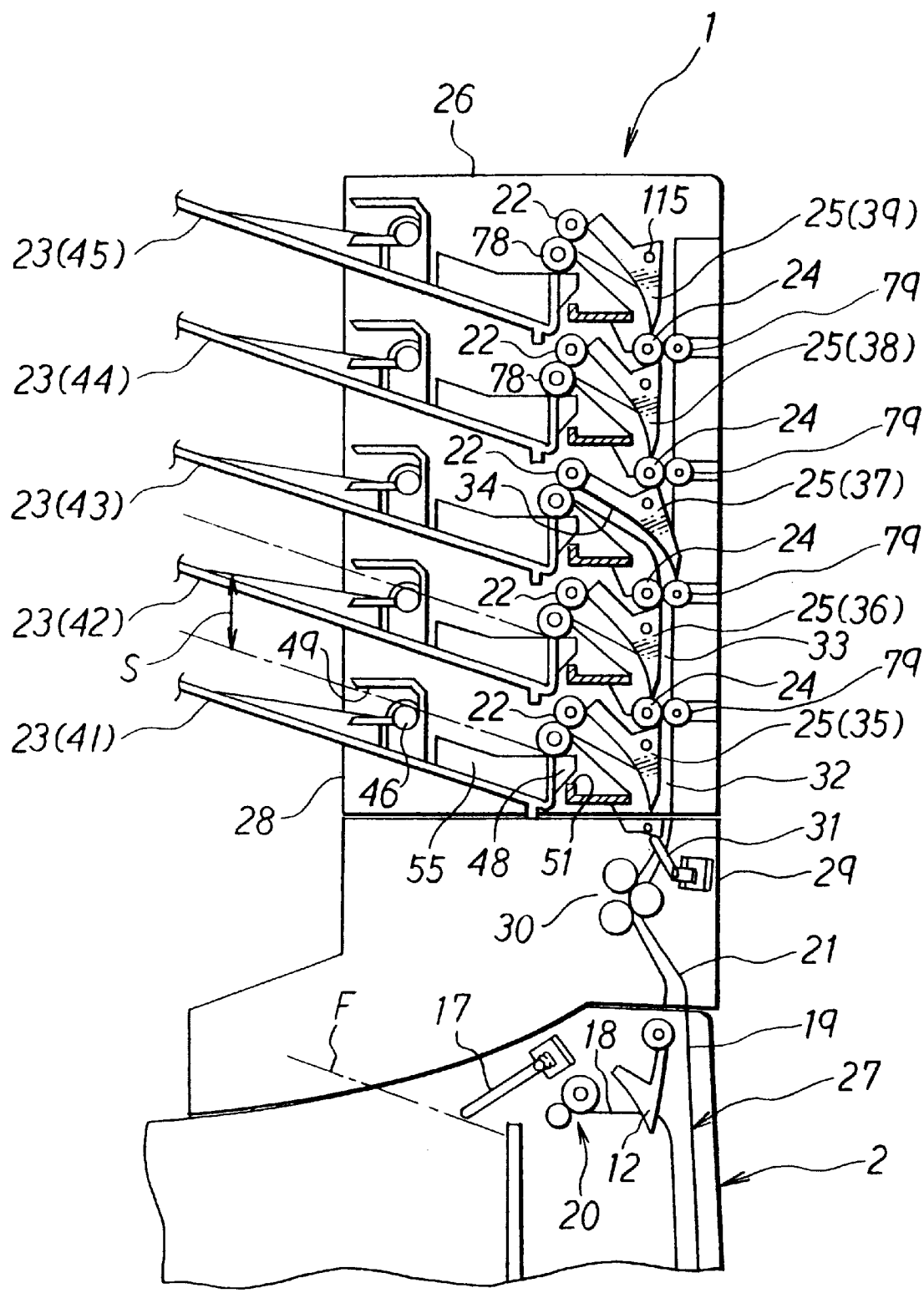
FIG. 2 shows a cross-sectional view of main components illustrating the paper sheet discharge apparatus shown in FIG. 1 in a magnified manner.

The paper sheet discharge apparatus 1 is detachably attached to the upper portion of the laser printer 2 constructed as described above. FIG. 2 shows a cross-sectional view of main components illustrating the paper sheet discharge apparatus 1 shown in FIG. 1 in a magnified manner.

Next, the paper sheet discharge apparatus 1 will be explained with reference to FIG. 2. As shown in FIG. 2, the paper sheet discharge apparatus 1 comprises, in its casing 26, an introducing passage 21 as the introducing section for receiving the paper sheet on which a predetermined image is formed by the image-forming apparatus 2, a plurality of delivery rollers 22,78 as discharge means or discharging unit for discharging the paper sheet, a plurality of bins 23 as storing units provided corresponding to the respective delivery rollers 22,78, for storing the paper sheets discharged from the respective delivery rollers 22,78, transport rollers 24 as transport means or transporter for transporting the paper sheet received from the introducing passage 21 to the respective delivery rollers 22,78, and a plurality of switching flappers 25 as switching means or transport direction switches for switching the transport direction in order to transport the paper sheet received from the introducing passage 21 to the specified delivery rollers 22,78.

The casing 26 is formed such that it is dividable into an upper casing 28 which is provided with the discharge rollers 22,78, the plurality of bins 23, the transport rollers 24, the switching flappers 25, and other components, and a lower casing 29 which is provided with the introducing passage 21. The lower casing 29 is detachably attached to the upper portion of the laser printer 2, and the introducing passage 21 is connected to the introducing passage-side guide passage 19 of the discharge unit 27.

The lower casing 29 is formed with the introducing passage 21 which penetrates through the lower casing 29 in the vertical direction for feeding the paper sheets discharged by the discharge roller 15 of the laser printer 2 toward the upper casing 28. The lower casing 29 is provided with an uncurling roller 30 for removing warpage of the paper sheet at an intermediate position of the introducing passage 21, and a count lever 31, as an introduction detector, for detecting the passage of the paper sheet at a downstream position from the uncurling roller 30.

The lower casing 29 further comprises a selector flapper 12 which protrudes downwardly from the lower casing 29 and which is inserted into the discharge unit 27 of the laser printer 2 when the lower casing 29 is attached to the upper portion of the laser printer 2. The selector flapper 12 switches the discharge direction to determine whether the paper sheet fed by the discharge roller 15 is discharged toward the discharge tray 16 or the paper sheet is discharged toward the introducing passage 21. The selector flapper 12 is provided to be swingable between a discharge tray-side guide position (position indicated by phantom lines in FIG. 1) to guide the paper sheet toward the discharge tray 16 and an introducing passage-side guide position (position indicated by solid lines in FIG. 1) to guide the paper sheet toward the introducing passage 21. The paper sheet, which is fed by the discharge roller 15, is selectively fed to the discharge tray-side guide passage 18 or the introducing passage-side guide passage 19 in accordance with the swinging action of the selector flapper 12. The selector flapper 12 is operated by a selector flapper-operating solenoid 77 as described later on (see FIG. 8). When the selector flapper 12 as described above is provided on the side of the paper sheet discharge apparatus 1, it is possible to simplify the apparatus construction of the laser printer 2, because all of the members for determining the discharge direction of the paper sheet can be arranged on the side of the paper sheet discharge apparatus 1. Alternatively, the selector flapper 12 may be provided on the side of the laser printer 2, not on the side of the paper sheet discharge apparatus 1. In this arrangement, it is possible to simplify the apparatus construction on the side of the paper sheet discharge apparatus 1.

The upper casing 28 has a box-shaped configuration with its one open side. A plurality of bins 23 for storing the paper sheets are arranged in a vertically aligned state and apart from one another on the open side. The plurality of bins 23 are arranged in a state of being successively aligned in an order of the fist bin 41, the second bin 42, the third bin 43, the fourth bin 44, and the fifth bin 45 from the lowermost position to the uppermost position.

The delivery rollers 22,78 are provided respectively at a side of upper end of the respective bins 23 in the sheet feeding direction. The respective delivery rollers 22,78 are provided as pairs. One of the pair of delivery rollers 22,78 is driven, and the other follows it. A transport passage 32 is formed in the upper casing 28. One end of the transport passage 32 is connected to the introducing passage 21 of the lower casing 29, and the other end thereof faces the respective delivery rollers 22,78. The transport passage 32 includes a vertically directed transport passage 33 formed in the vertical direction through the upper casing 28, and a plurality of delivery transport passages 34 branched from the vertically directed transport passage 33 toward the respective delivery rollers 22,78. The transport passage 32 makes it possible to guide the paper sheets received by the introducing passage 21 to the respective delivery rollers 22,78.

Switching flappers 25 corresponding to the respective delivery rollers 22,78 are provided respectively at positions where the vertically directed transport passage 33 is branched to the respective delivery transport passages 34 (in the following description, when it is intended to distinguish the switching flappers 25 corresponding to the first to fifth bins 41 to 45 respectively from each other, they are referred to as first to fifth flappers 35 to 39 respectively). The switching flapper 25 is supported so as to swing between a vertically directed guide position (position indicated by the switching flappers 25 other than the third switching flapper 37 in FIG. 2) for guiding the paper sheet in the vertical direction and a delivery-directed guide position (position indicated by the third switching flapper 37 in FIG. 2) for guiding the paper sheet to the corresponding delivery rollers 22,78. The paper sheet, which has been introduced into the upper casing 28, is guided through the vertically directed transport passage 33 to the arbitrary delivery transport passage 34 in accordance with the swinging action of the switching flapper 25.

The transport rollers 24 for transporting the paper sheets in the vertical direction are provided between the respective switching flappers 25 in the vertically directed transport passage 33. The respective transport rollers 24 are provided as pairs. One of the pair of transport rollers 24 is driven, and the other follows it.

The paper sheets, which are discharged from the laser printer 2, are stored in the respective bins 23 as follows in the paper sheet discharge apparatus 1 constructed as described above.

That is, when the selector flapper 12 is switched to be at the introducing passage-side guide position (position indicated by the solid lines in FIG. 1) in the discharge unit 27 of the laser printer 2, the paper sheet, on which the predetermined image is formed, is received from the discharge roller 15 through the selector flapper 12 to the introducing passage 21 formed in the lower casing 29 of the paper sheet discharge apparatus 1. The warpage of the paper sheet received by the introducing passage 21 is removed by the uncurling roller 30. After that, the paper sheet pushes and moves the count lever 31, and it is introduced into the transport passage 32 on the side of the upper casing 28. When the count lever 31 is pushed and moved, then the detection signal is outputted, and the presence or absence of advance of the paper sheet into the paper sheet discharge apparatus 1 is judged by CPU 40 as described later on. The count lever constitutes a jamming detector described later on.

The paper sheet, which has been introduced into the transport passage 32, is transported through the vertically directed transport passage 33 in accordance with the rotational driving of the transport rollers 24. When the paper sheet arrives at the switching flapper 25 located at the delivery-directed guide position, then the paper sheet is guided by the switching flapper 25, and it is guided to the delivery rollers 22,78 corresponding to the switching flapper 25. This process will be described in further detail below. The first to fifth flappers 35 to 39 are controlled by the control circuit 75 in accordance with instructions of the CPU 40 described later on (see FIG.8). Accordingly, only the specified switching flapper 25, corresponding to the bin 23 in which it is intended to store the paper sheet, is positioned in the delivery-directed guide position. The other switching flappers 25 are positioned in the vertically directed guide position. The switching flapper 25 is switched by operating a switching flapper-operating solenoid 64 shown in FIGS. 3 and 8 as described later on.

FIG. 2 is illustrative of the case to store the paper sheets in the third bin 43, in which the first, second, fourth, and fifth flappers 35, 36, 38, 39 other than the third flapper 37 are positioned at the vertically directed guide position, while only the third flapper 37 is positioned at the delivery-directed guide position. In the illustrative case shown in FIG. 2, when the paper sheet is introduced into the transport passage 21, the paper sheet is fed upwardly through the vertically directed transport passage 33 by the aid of the transport rollers 24, because the first and second switching flappers 35, 36 are located at the vertically directed guide position. When the paper sheet arrives at the third flapper 37 located at the delivery-directed guide position, then the transport direction is switched into the direction directed to the delivery transport passage 34, and the paper sheet is fed to the delivery rollers 22,78 corresponding to the third bin 43. The paper sheet is discharged by the delivery rollers 22,78, and it is stored in the third bin 43. All of the delivery rollers 22,78 and the transport rollers 24 are driven by a motor 65 shown in FIG. 3 by the aid of driving shafts 178 and an gear array in the gear box 179.

According to the apparatus constructed as described above, the paper sheet, which is received from the introducing passage 21, is transported through the vertically directed transport passage 33 by the aid of the transport rollers 24,79 without decreasing its speed until the paper sheet arrives at the specified switching flapper 25. After the transport direction is switched by the specified switching flapper 25, the paper sheet is discharged by the delivery rollers 22,78 without decreasing its speed toward the bin 23 corresponding to the delivery rollers 22,78 until the frontward end and the rearward end of the paper sheet are completely discharged. Therefore, the paper sheet, on which the image is formed by the laser printer 2, is sorted and accommodated reliably at a high speed.

In the paper sheet discharge apparatus 1, the plurality of bins 23 are detachably attached to the upper casing 28.

Figure 3:
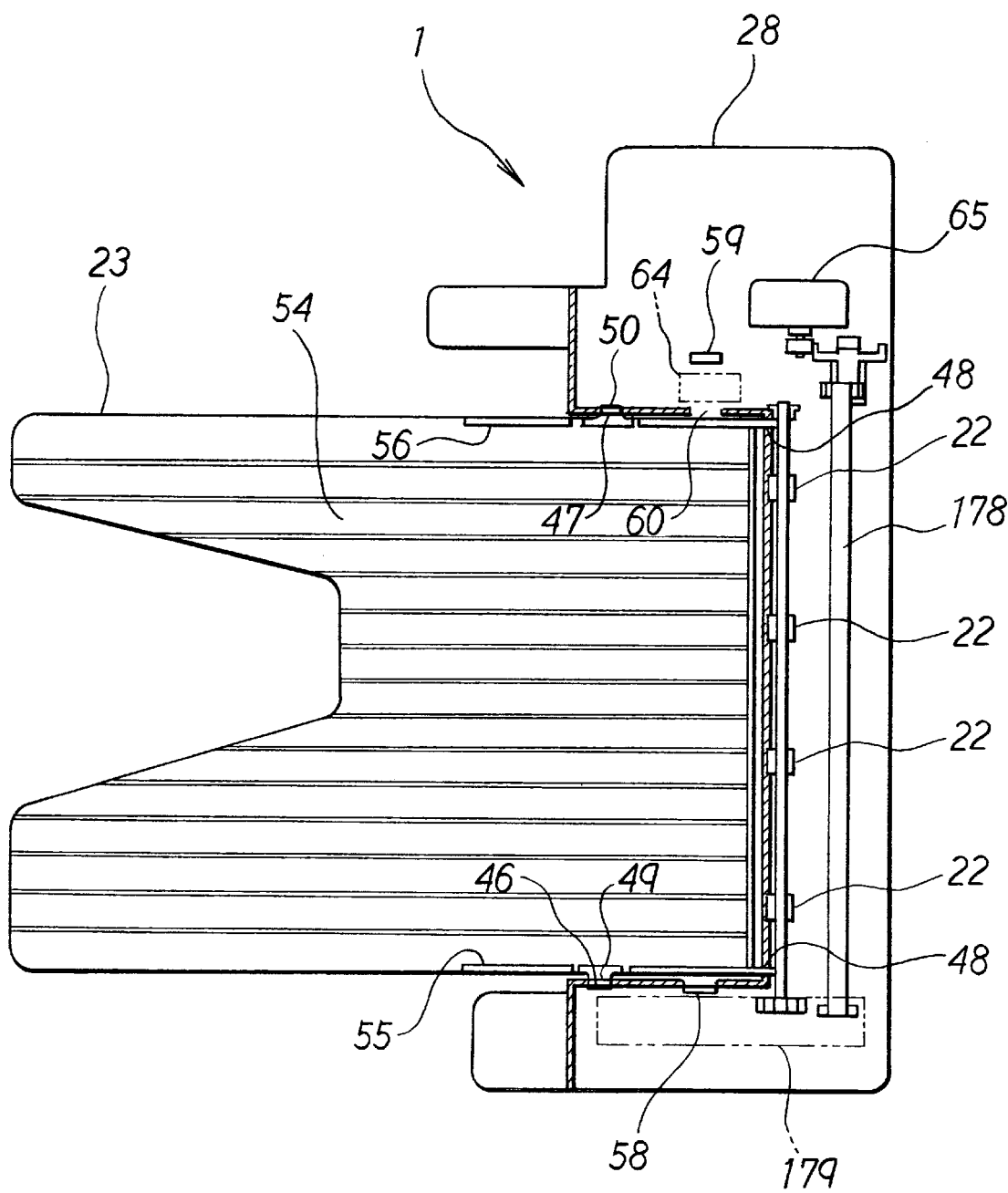
FIG. 3 shows a cross-sectional top view of main components in which a bin is viewed from an upper position.
Figure 4:
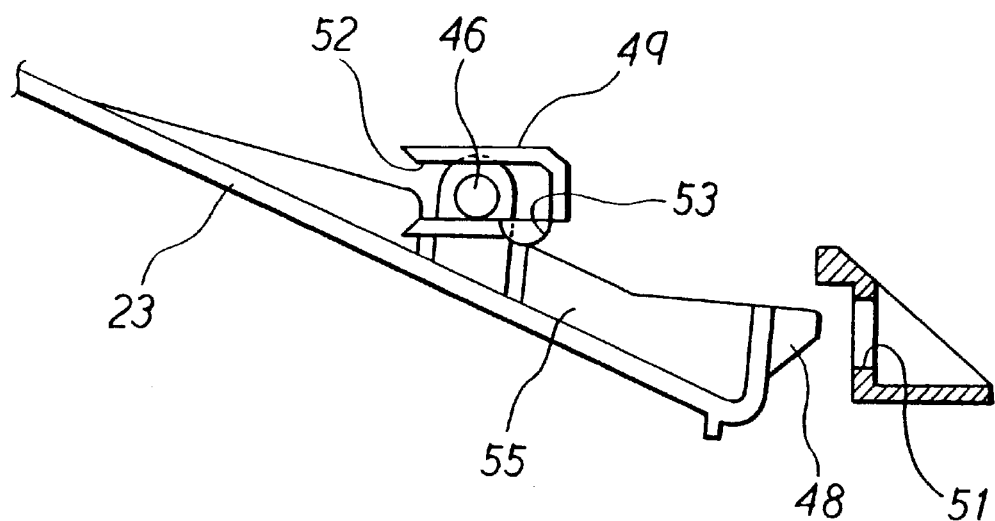
FIG. 4 illustrates an attachment/detachment state of the bin shown in FIG. 2.
Figure 5:
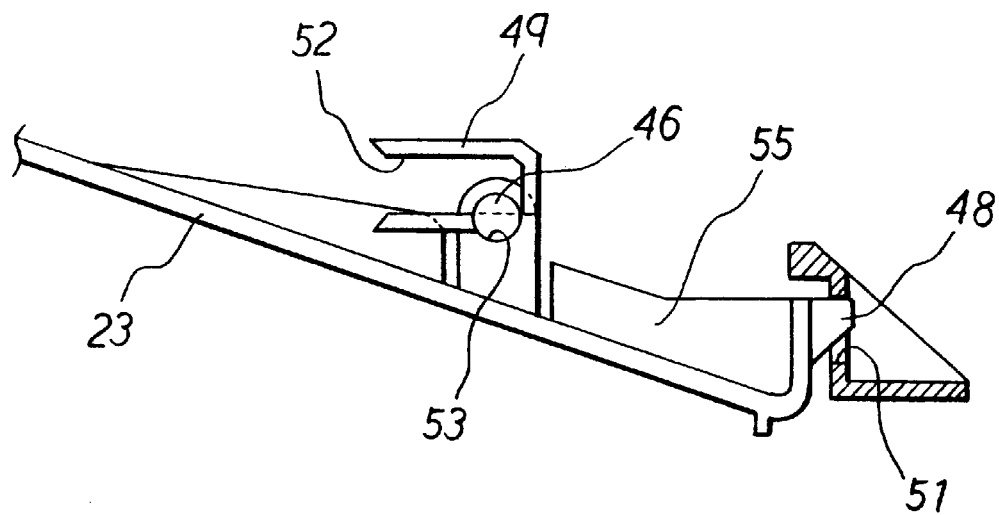
FIG. 5 illustrates an attachment/detachment state of the bin shown in FIG. 2.
Figure 6:
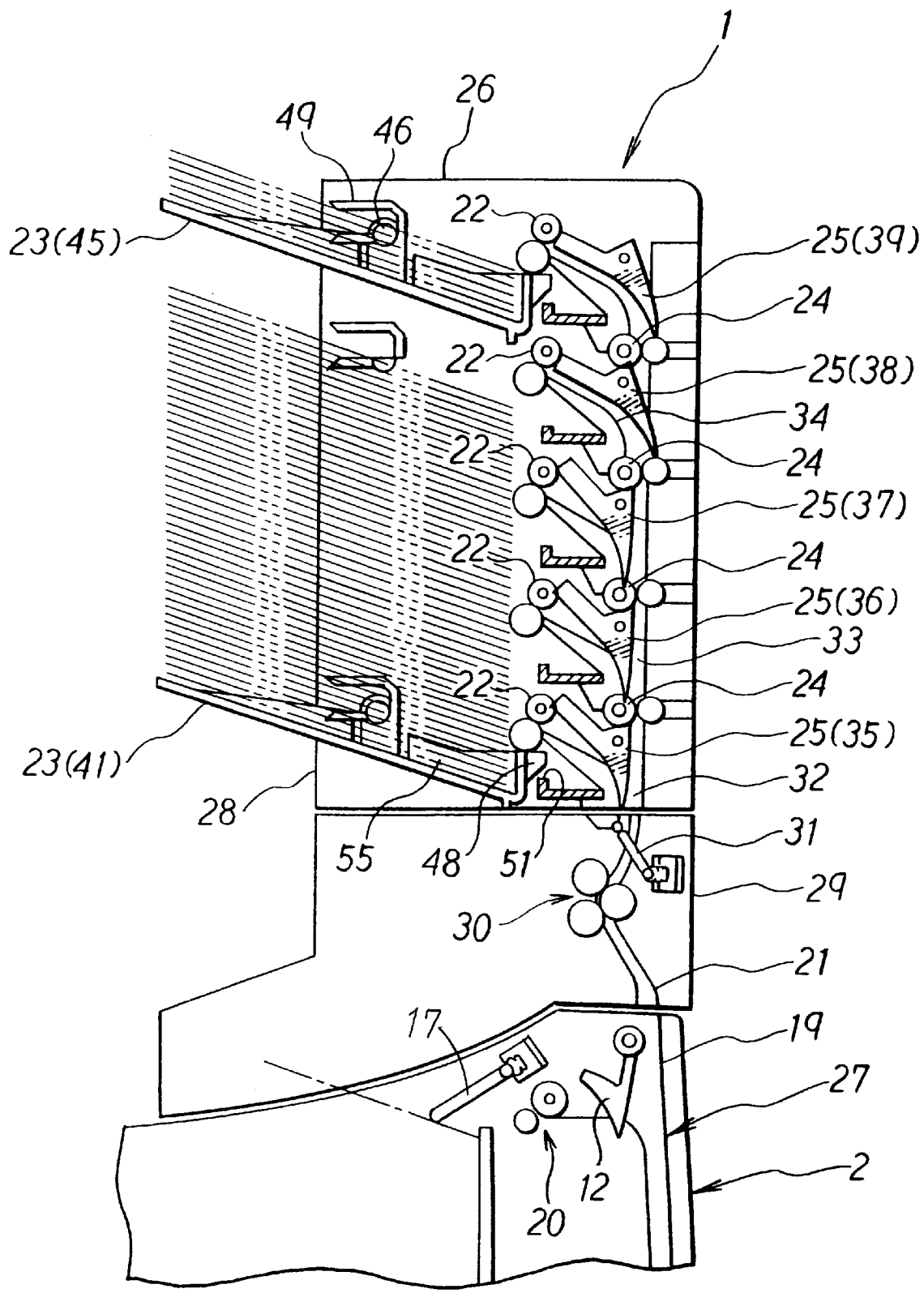
FIG. 6 shows a cross-sectional view of main components corresponding to FIG. 2, illustrating a state in which the second to fourth bins are removed.

FIG. 3 shows a cross-sectional top view of main components in which one of the bins 23 is viewed from an upper position. FIGS. 4 and 5 illustrate attachment/detachment states of the bin 23. FIG. 6 shows a cross-sectional view of main components corresponding to FIG. 2, illustrating a state in which the second to fourth bins 42 to 44 are removed. The attachment and the detachment of the bin 23 will be explained with reference to FIGS. 3 to 6.

Each of the bins 23 is provided with a receiving tray section 54 for receiving the paper sheets as shown in FIG. 3, and guide sections 55, 56 which rise perpendicularly from both widthwise ends of the receiving tray section 54 as shown in FIGS. 4 and 5 respectively. The both guide sections 55, 56 are formed with columnar side projections 46, 47 which protrude in the widthwise direction respectively. Rear projections 48 are formed at their rearward ends to protrude in the rearward direction. On the other hand, as shown in FIG. 3, side receiving grooves 49, 50, which are opposed to the side projections 46, 47, are formed on the upper casing 28. As shown in FIGS. 4 and 5, rear receiving holes 51, which are opposed to the rear projections 48, are formed on the upper casing 28. Each of the side receiving grooves 49, 50 has a long groove section 52 which extends in the longitudinal direction, and an arc-shaped fastening section 53 which are disposed at a rearward lower portion of the long groove section 52 for fixing the side projection 46, 47.

When the bin 23 is installed to the upper casing 28, the side projections 46, 47 are inserted through openings of the long groove sections 52 as shown in FIG. 4. The side projections 46, 47 are allowed to fall into the fastening sections 53 as shown in FIG. 5, simultaneously with which the rear projections 48 are inserted into the rear receiving holes 51. By doing so, the bin 23 is rotated counterclockwise as shown in FIG. 5 by its own weight about the center of the projections 46, 47, and upper portions of the rear projections 48 are fastened to upper portions of the rear receiving holes 51. Thus, the bin 23 is fixed. When the bin 23 is removed, a process reverse to the above may be performed. That is, the side projections 46, 47 are successfully drawn through the openings of the long groove sections 52. When the respective bins 23 are detachably attached as described above, the following advantage is obtained. That is, for example, the respective bins 23 are installed during the ordinary use, and they can be used for the sorting process (state shown in FIG. 2). Further, when it is intended to stack a large number of paper sheets, an arbitrary bin 23 or arbitrary bins 23 may be removed. Thus, the space, which is formed by removing the bin or bins 23 (as indicated by S in FIG. 2), can be used as a space for storing the paper sheets, making it possible to use the space as a stacker for storing a larger amount of paper sheets. FIG. 6 is illustrative of an embodiment of the use as a stacker as described above. In FIG. 6, only the first bin 41 and the fifth bin 45 are installed, and the second to fourth bins 42 to 44 are removed. FIG. 6 shows a state in which a larger amount of paper sheets are stacked on the first bin 41 to such an extent that the second to fourth bins 42 to 44 are eliminated.

Figure 7:
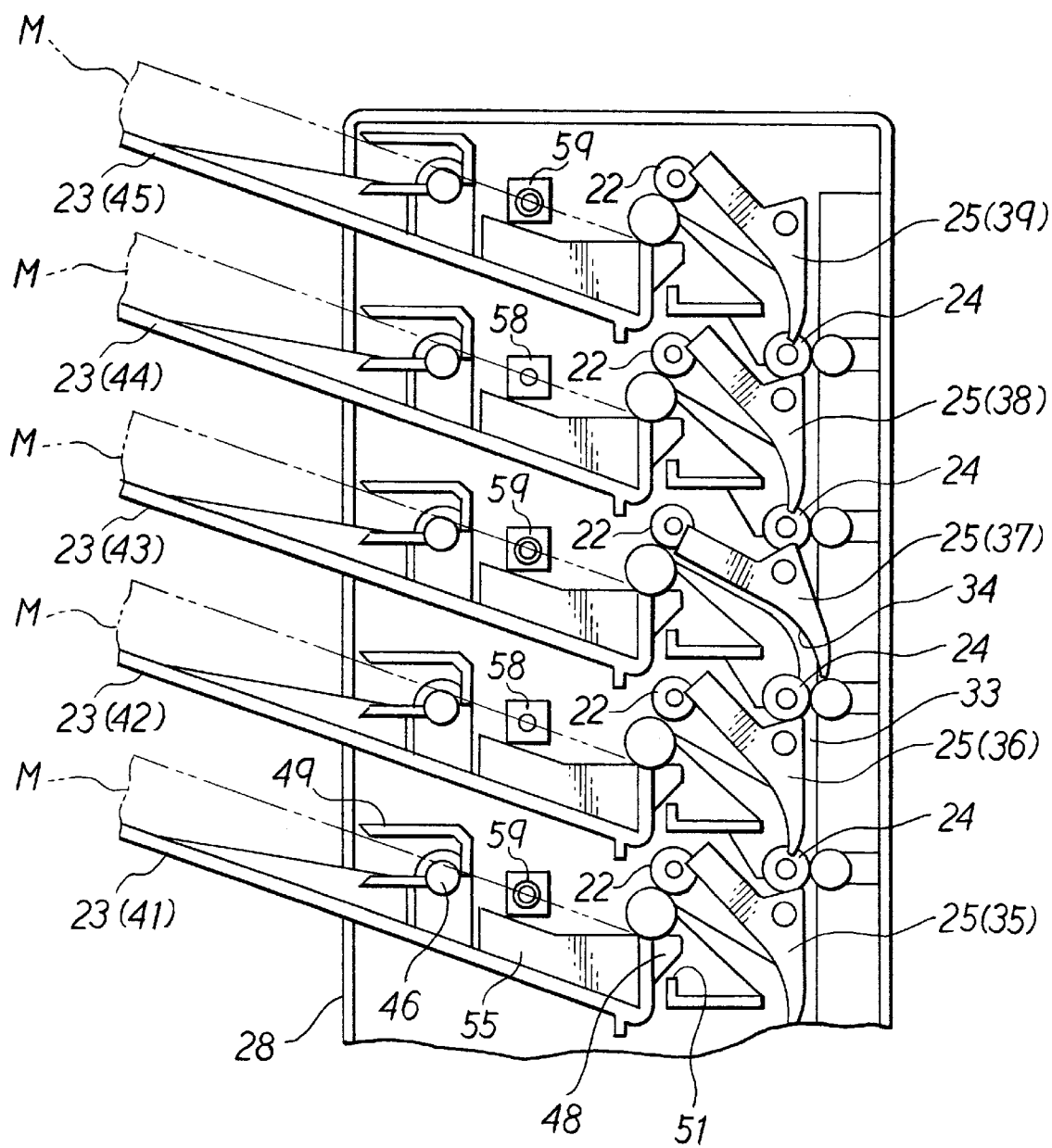
FIG. 7 is an enlarged cross-sectional view of part of the paper sheet discharge apparatus shown in FIG. 2, showing the arrangement of the bin level sensors of the apparatus.

The bin level sensors 57 as storage amount detecting means or storage amount detectors are provided for the respective bins 23 to determine whether each bin is filled with paper sheets. FIG. 7 illustrates operation states of the bin level sensor 57 corresponding to FIG. 2. The operation of the bin level sensor 57 will be explained with reference to FIG. 3 and FIGS. 7 to 9.

Each bin level sensor 57 is an optical sensor including a light emitter 58 and a light receiver 59, which have a light emitting element and a light receiving element, respectively. As shown in FIG. 3, the emitter 58 and the receiver 59 are fixed in the upper casing 28, and located near the rear end of the associated bin 23 on opposite sides of the associated bin tray section 54. The emitter 58 emits light across the direction in which paper sheets can be discharged to the bin 23. If the discharged sheets stacked in the bin 23 block off the light, the sensor 57 detects the full level of the stacked sheets. More specifically, as shown in FIG. 7, the emitter 58 and the receiver 59 are positioned at the full level, which is indicated by two-dot chain lines M. If the light from the emitter 58 is prevented by the stacked sheets for a predetermined time from reaching the receiver 59, the full level is detected by a CPU 40 (FIG. 8) as a storage amount judging means or device, which will be mentioned later. It is therefore possible to detect the full level reliably by using the simple sensor 57 structure or mechanism.

Thus, even if the discharged sheets stacked in the bin 23 are once taken out and then returned into it, the returned sheets do not come into contact with the bin level sensor 57. The conventional bin level sensors come into contact with stacked sheets to detect the full level of the sheets. Returned sheets push the conventional sensors, which will then prevent the next sheets from being discharged. Contrariwise, the sensor 57 allows paper sheets to be discharged in good condition. Since the sensor 57 detects the full level of the sheet only when the light emitted from the emitter 58 is prevented by the stacked sheets for a predetermined time from reaching the receiver 59, the full level can be detected reliably.

As shown in FIG. 7, the light emitter 58 and receiver 59 of the bin level sensor 57 for each bin 23 alternate with the counterparts for the adjacent bin or bins. If all the emitters 58 were positioned on one side and all the receivers 59 were positioned on the other, the removal of one of the bins 23 might cause light from the emitter 58 of one of the sensors 57 of the remaining bins 23, which the removed bin shut off from each other to reach the receiver 59 of a remaining bins sensor 57. By positioning the emitter 58 for one of two adjacent bins 23 adjacently to the receiver 59 for the other, as shown in FIG. 7, it is possible to prevent the receiver 59 for one of two adjacent bins 23 from detecting light from the emitter 58 for the other bin 23 even if an upper bin is removed. Consequently, when one or some of the bins 23 are removed, adjacent sensors 57 are prevented from making erroneous or wrong detection.

The paper sheet discharge apparatus 1 according to the embodiment of the present invention, which is provided with the bin level sensors 57 for the respective bins 23, is controlled as follows. That is, if the bin level sensor 57 detects the fact that the specified bin 23 is filled with the discharged paper sheets, the switching flapper 25 is switched so that the paper sheets are transported to another bin 23 for which the full level is not detected.

Figure 8:
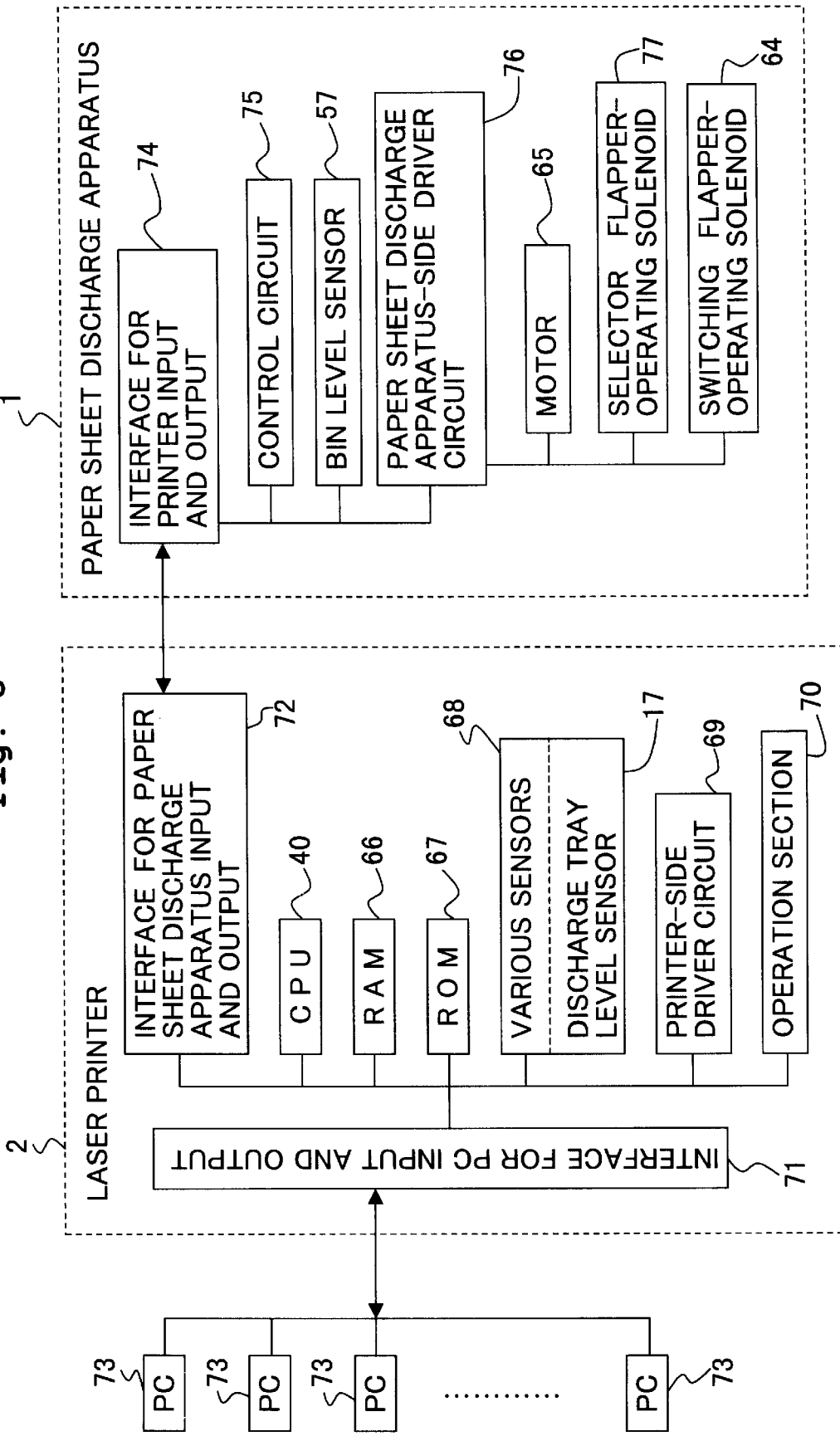
FIG. 8 shows a block diagram illustrating control systems of the laser printer and the paper sheet discharge apparatus.

FIG. 8 shows a block diagram illustrating control systems for performing the control as described above. At first, explanation will be made with reference to FIG. 8 for the control systems of the paper sheet discharge apparatus 1 and the laser printer 2.

Those connected in the control system of the laser printer 2 include respective sections of CPU 40, RAM 66, ROM 67, various sensors 68, a printer-side driver circuit 69, an operation section 70, an interface 71 for PC input and output, and an interface 72 for paper sheet discharge apparatus input and output. RAM 66 is a memory for temporary storage, and it stores, for example, received data inputted from an external personal computer (hereinafter referred to as "PC") 73 via the interface 71 for PC input and output, and bitmap data prepared in accordance with the received data. ROM 67 stores various execution programs, and it stores, for example, a conversion program for converting the received data stored in RAM 66 into the bitmap data, a selective discharge control program, a discharge control program, and a sequential discharge control program as described later on. The various sensors include the counter lever 31 and the discharge tray level sensor 17 as described above. The printer side-driver circuit 69 drives and controls electrically driven members of the laser printer 2 such as the motor for driving the various rollers, the laser scanner 133, the image-forming unit 4, and the fixing unit 5 in accordance with the instruction given by CPU 40. The operation section 70 is provided with various input switches and the like.

On the other hand, those connected to an interface 74 for printer input and output in the control system of the paper sheet discharge apparatus 1 include a control circuit 75, the bin level sensors 57 provided for the respective bins 23, and a paper sheet discharge apparatus-side driver circuit 76. The control circuit 75 controls the paper sheet discharge apparatus-side driver circuit 76 in accordance with the instruction supplied from CPU 40 of the laser printer 2 via the interface 74 for printer input and output and the interface 72 for paper sheet discharge apparatus input and output, and it transmits the detection state of the bin level sensor 57 to CPU 40 of the laser printer 2. The paper sheet discharge apparatus-side driver circuit 76 drives electrically driven members of the paper sheet discharge apparatus 1 such as the motor 65, the selector flapper-operating solenoid 77, and the switching flapper-operating solenoid 64 in accordance with the instruction given by the control circuit 75.

Next, explanation will be made with reference to flow charts shown in FIGS. 9 to 11 for the process executed by CPU 40 by using the control systems as described above in which a predetermined image is formed on the paper sheet to be ultimately discharged in accordance with the execution programs stored in ROM 67 when the received data from the external PC 73 is received by the laser printer 2.

Figure 9:
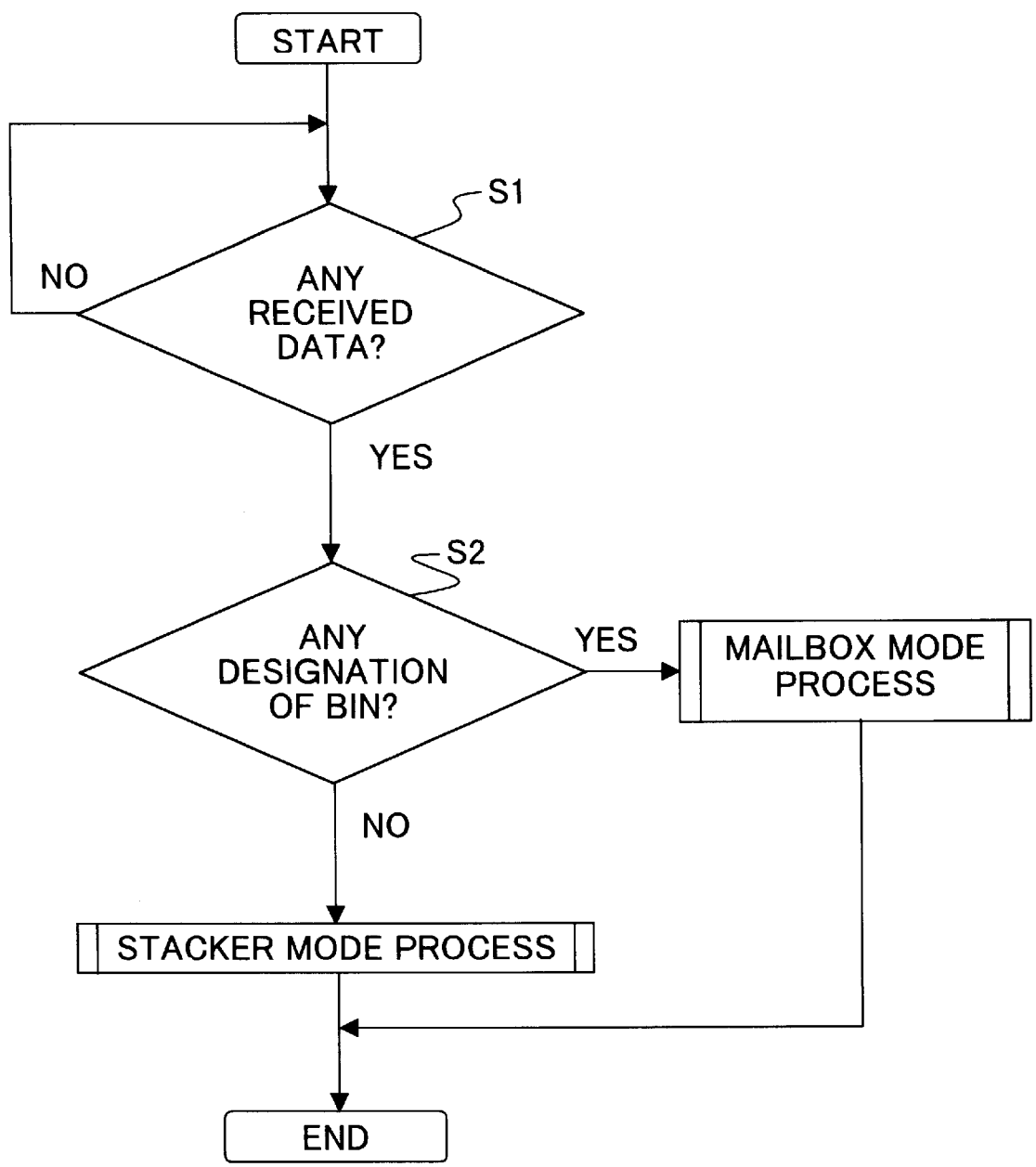
FIG. 9 shows a flow chart up to execution of the process in a mailbox mode or a stacker mode when received data is received from external PC by the laser printer.
Figure 10:
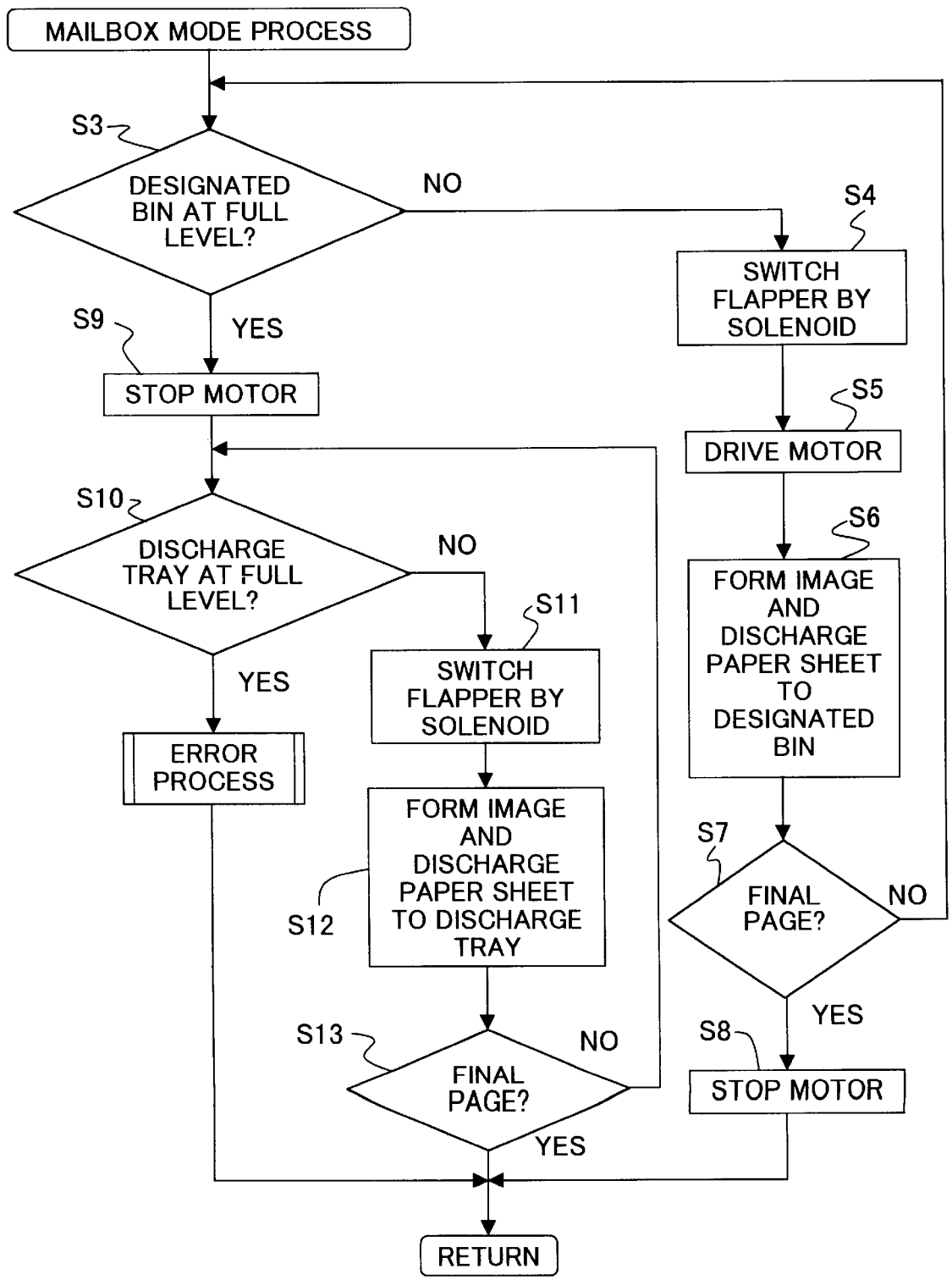
FIG. 10 shows a flow chart illustrating the process in the mailbox mode.

At first, reference is made to FIG. 9. If the received data is received in RAM 66 (S1: YES) from the external PC 73 via the interface 71 for PC input and output, it is judged whether or not there is any designation in the received data of the bin 23 for which the delivery operation is performed, i.e., there is any designation of sheet delivery to the specified bin 23 of the first to fifth bins 41 to 45 (S2). If there is the certain designation of the bin 23 (S2: YES), the system executes the mailbox mode process for using the paper sheet discharge apparatus 1 as a so-called mailbox, in which a specified person uses only its allotted own bin 23 of the plurality of bins 23. If there is no designation of the specified bin 23 (S2: NO), the system executes the stacker mode process for using the paper sheet discharge apparatus 1 as a stacker in which the paper sheets formed with the predetermined image are successively stored.

Next, explanation will be made with reference to FIG. 10 for the mailbox mode process which is executed when the bin 23 to which the paper sheets are discharged is designated (S2: YES). At first, it is judged whether or not there is any detection of the full level concerning the bin level sensor 57 for the designated bin 23 (S3). If the bin level sensor 57 for the designated bin 23 does not detect the full level (S3: NO), then the selector flapper-operating solenoid 77 is firstly operated to allow the selector flapper 12 to make swinging movement to the introducing passage-side guide position so that the paper sheet may be guided from the introducing passage-side guide passage 19 into the introducing passage 21. The switching flapper-operating solenoids 64 are also operated so that only the selector flapper 25 corresponding to the designated bin 23 is allowed to make swinging movement to the delivery-directed guide position, and the other flappers 25 are allowed to make swinging movement to the vertically directed guide position (S4). Thus, a state is given, in which the paper sheet can be guided to the delivery rollers 22,78 corresponding to the designated bin 23. Subsequently, the motor 65 of the paper sheet discharge apparatus 1 is driven to rotate and drive the delivery rollers 22,78 and the transport rollers 24,79 (S5). The image-forming operation is executed by the laser printer 2 to discharge the paper sheet on which the predetermined image is formed. The paper sheet, which is discharged from the laser printer 2, is introduced into the paper sheet discharge apparatus 1, and it is discharged to the designated bin 23 (S6). These processes (processes ranging from S3 to S6) are repeated until images of all pages included in the received data are formed, i.e., until arrival at the final page (S7: NO). If the process for the final page is completed (S7: YES), then the driving operation of the motor 65 is stopped (S8), and the process comes to an end.

On the other hand, if the bin level sensor 57 for the designated bin 23 of the paper sheet discharge apparatus 1 detects the full level (S3: YES), the driving of the motor 65 of the paper sheet discharge apparatus 1 is stopped (S9). Then, the judgement is made for the presence or absence of the detection of the full level effected by the discharge tray level sensor 17 for detecting the full level of the discharge tray 16 of the laser printer 2 (S10). If the full level is not detected by the discharge tray level sensor 17 (S10: NO), the selector flapper-operating solenoid 77 is operated to allow the selector flapper 12 to make swinging movement to the discharge tray-side guide position so that the paper sheet is guided to the discharge tray-side guide passage 18 (S11). Subsequently, the image-forming operation is executed by the laser printer 2. The paper sheet, on which the predetermined image is formed, is discharged onto the discharge tray 16 (S12). These processes (processes ranging from S10 to S12) are repeated until arrival at the final page (S13: NO). If the process for the final page is completed (S13: YES), then the process comes to an end, and the system is in a state of waiting for the next job. If the full level is detected by the discharge tray level sensor 17 (S10: YES), it is impossible to discharge the paper sheet to both of the designated bin 23 of the paper sheet discharge apparatus 1 and the discharge tray 16 of the laser printer 2. Therefore, the image-forming operation is not executed. A predetermined error process is executed to inform the user of the fact that the paper sheet cannot be discharged.

In the embodiment of the present invention, when the designated bin 23 of the paper sheet discharge apparatus 1 is filled with the paper sheets making it impossible to store any more paper sheet, if the discharge tray 16 of the laser printer 2 is not filled with the paper sheets, then the paper sheets are continuously discharged to the discharge tray 16. Therefore, the frequency of interruption is reduced, as compared with a case in which the image-forming operation is interrupted every time when the designated bin 23 is filled with the paper sheets.

Figure 11A:
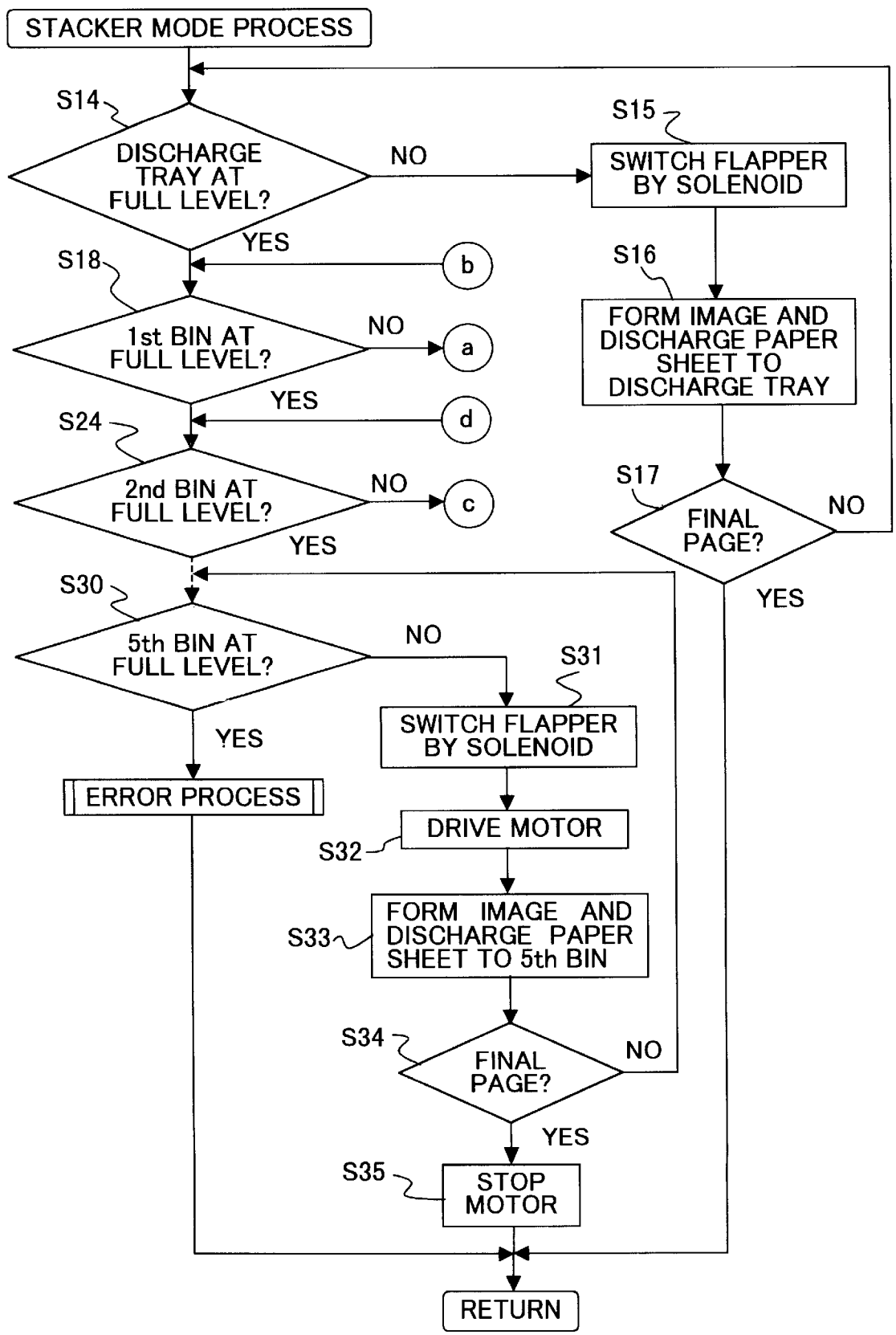
FIGS. 11A and B show a flow chart illustrating the process in the stacker mode.
Figure 11B:
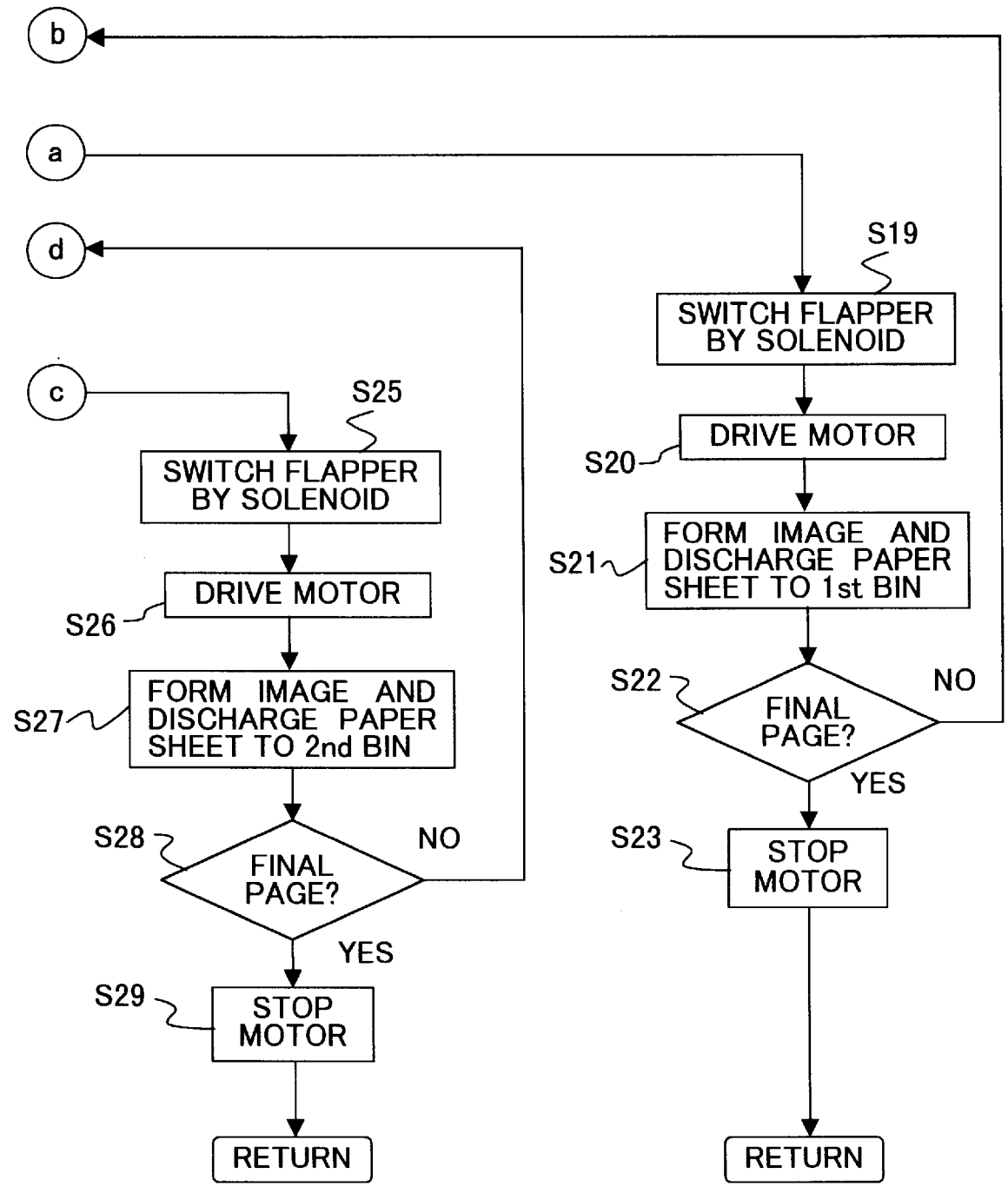

Next, the stacker mode process will be explained with reference to FIGS. 11A and 11B. This process is executed by using the selective discharge control program stored in ROM 67, the discharge control program, and the sequential discharge control program. If the bin 23 to which the paper sheet is discharged is not designated in FIG. 9 (S2: NO), the stacker mode process shown in FIGS. 11A and B is executed. In the stacker mode process, the judgement is firstly made for the presence or absence of the detection of the full level by the discharge tray level sensor 17 for detecting the full level of the discharge tray 16 of the laser printer 2 (S14). If the full level is not detected by the discharge tray level sensor 17 (S14: NO), then the selector flapper-operating solenoid 77 is operated, and the selector flapper 12 is allowed to make swinging movement to the discharge tray-side guide position so that the paper sheet is guided to the discharge tray-side guide passage 18 (S15). Subsequently, the image-forming operation is executed by the laser printer 2. The paper sheet, on which the predetermined image is formed, is discharged onto the discharge tray 16 (S16). These processes (ranging from S14 to S16) are repeated until arrival at the final page (S17: NO). If the process for the final page is completed (S17: YES), the process comes to an end.

On the other hand, if the discharge tray level sensor 17 detects the full level (S14: YES), the paper sheet cannot be discharged to the discharge tray 16 of the laser printer 2. Therefore, it is subsequently judged whether or not the bin level sensor 57 corresponding to the first bin 41 disposed at the lowermost position of the paper sheet discharge apparatus 1 detects the full level (S18). If the bin level sensor 57 corresponding to the first bin 41 does not detect the full level (S18: NO), then the selector flapper-operating solenoid 77 is firstly operated, and the selector flapper 12 is allowed to make swinging movement to the introducing passage-side guide position so that the paper sheet may be guided from the introducing passage-side guide passage 19 into the introducing passage 21. Further, the respective switching flapper-operating solenoids 64 are operated so that only the first flapper 35 is allowed to make swinging movement to the delivery-directed guide position, and the other second to fifth flappers 36 to 39 are allowed to make swinging movement to the vertically directed guide position (S19) to give a state in which the paper sheet can be guided to the transport rollers 22,78 corresponding to the first bin 41. Subsequently, the motor 65 of the paper sheet discharge apparatus 1 is driven to rotate and drive the delivery rollers 22,78 and the transport rollers 24 (S20). The image-forming operation is executed by the laser printer 2, and the paper sheet, on which the predetermined image is formed, is discharged. The paper sheet, which is discharged from the laser printer 2, is introduced into the paper sheet discharge apparatus 1, and it is discharged to the first bin 41 (S21). These processes (ranging from S18 to S21) are repeated until arrival at the final page (S22: NO). If the process for the final page is completed (S22: YES), then the driving operation of the motor 65 is stopped (S23), and the process comes to an end.

Next, if the bin level sensor 57 corresponding to the first bin 41 of the paper sheet discharge apparatus 1 detects the full level (S18: YES), it is impossible to discharge the paper sheet to the discharge tray 16 of the laser printer 2 and the lowermost first bin 41 of the paper sheet discharge apparatus 1. Therefore, it is subsequently judged whether or not the bin level sensor 57 corresponding to the second bin 42 disposed at the second position from the bottom of the paper sheet discharge apparatus 1 detects the full level (S24). If the bin level sensor 57 corresponding to the second bin 42 does not detect the full level (S24: NO), the following operation is performed in the same manner as performed for the first bin 41. That is, the selector flapper-operating solenoid 77 is firstly operated, and the selector flapper 12 is allowed to make swinging movement to the introducing passage-side guide position so that the paper sheet may be guided from the introducing passage-side guide passage 19 into the introducing passage 21. Further, the respective switching flapper-operating solenoids 64 are operated so that only the second flapper 36 is allowed to make swinging movement to the delivery-directed guide position, and the other first to third and fifth flappers 35, 37 to 39 are allowed to make swinging movement to the vertically directed guide position (S25) to give a state in which the paper sheet can be guided to the transport rollers 22,78 corresponding to the second bin 42. Subsequently, the motor 64 of the paper sheet discharge apparatus 1 is driven to rotate and drive the delivery rollers 22,78 and the transport rollers 24 (S26). The image-forming operation is executed by the laser printer 2, and the paper sheet, on which the predetermined image is formed, is discharged. The paper sheet, which is discharged from the laser printer 2, is introduced into the paper sheet discharge apparatus 1, and it is discharged to the second bin 42 (S27). These processes (ranging from S24 to S27) are repeated until arrival at the final page (S28: NO). If the process for the final page is completed (S28: YES), then the driving operation of the motor 65 is stopped (S29), and the process comes to an end.

Next, if the bin level sensor 57 corresponding to the second bin 42 of the paper sheet discharge apparatus 1 detects the full level (S24: YES), it is subsequently judged whether or not the bin level sensor 57 corresponding to the third bin 43 disposed at the third position from the bottom detects the full level. If the bin level sensor 57 corresponding to the third bin 43 does not detect the full level, the paper sheet is discharged to the third bin 43 in accordance with the same process as performed for the first and second bins 41, 42 described above. Further, if the bin level sensor 57 corresponding to the third bin 43 detects the full level, the paper sheet is subsequently discharged to the fourth bin 44 disposed at the fourth position from the bottom. If the bin level sensor 57 corresponding to the fourth bin 44 detects the full level, it is judged whether or not the bin level sensor 57 corresponding to the uppermost fifth bin 45 detects the full level (S30). If the full level is not detected (S30: NO), the paper sheet is discharged to the fifth bin 45 (S30 to S35) in accordance with the same process as performed for the first to fourth bins 41 to 44 described above. If the bin level sensor 57 corresponding to the fifth bin 45 detects the full level (S30: YES), it is impossible to discharge the paper sheet to the discharge tray 16 of the laser printer 2 and all of the bins 41 to 45 of the paper sheet discharge apparatus 1. Therefore, the image-forming operation is not executed. A predetermined error process is executed to inform the user of the fact that the paper sheet cannot be discharged.

As described above, when the control is made in the foregoing manner in the stacker mode, the discharge tray level sensor 17 detects the full level if the discharge tray 16 is filled with the paper sheets during the process in which the paper sheet, on which the predetermined image is formed, is discharged to the discharge tray 16. The selective discharge control program is executed to automatically switch the selector flapper 12 so that the paper sheet is guided to the introducing passage 21 of the paper sheet discharge apparatus 1. Accordingly, no excessive paper sheet, which exceeds a predetermined storage amount, is stacked on the discharge tray 16. The paper sheets corresponding to the excessive amount can be successfully stored in the bin 23.

The discharge control program is executed as follows. That is, if the specified bin 23, to which the paper sheet is transported, is filled with the paper sheets, the bin level sensor 57 detects the full level. Subsequently, the switching flapper 25 is switched so that the paper sheet is transported to another bin 23 for which the bin level sensor 57 does not detect the full level, i.e., the another bin 23 which is not filled with the paper sheets. Accordingly, if the specified bin 23 is filled with the paper sheets, the paper sheet is automatically and successively transported to another bin 23 which is not filled with the paper sheets. Therefore, no excessive paper sheet, which exceeds a predetermined storage amount, is stacked on each of the bins 23. The paper sheets can be successfully stored in the respective bins 23. Further, in the embodiment of the present invention, the sequential discharge program is executed as follows. That is, the paper sheets are successively transported in the order starting from the lowermost bin 23 of the first to fifth bins 41 to 45 aligned in the vertical direction, and the paper sheets are successively stored in the respective bins 23. Therefore, the stored paper sheets are not stored in the plurality of bins 23 in a random state, but the paper sheets can be stored in a regular state. Thus, it is possible to realize efficient storage.

Further, in order to increase the paper sheet storage amount of the paper sheet discharge apparatus 1, an arbitrary bin 23 or arbitrary bins 23 disposed over the lowermost first bin 41 may be removed. Even in such a situation, the discharge destination of the paper sheet is switched depending on the detection of the full level effected by the bin level sensor 57 for each of the bins 23 starting from the delivery rollers 22,78 corresponding to the lowermost bin 41 and successively being changed to the delivery rollers 22,78 corresponding to the upper bins 23. Therefore, when the paper sheet is discharged from the respective delivery rollers 22,78, the falling distance of the paper sheet to the bin 23 is never increased. Thus, the paper sheets can be reliably stored in an aligned state.

Figure 12:
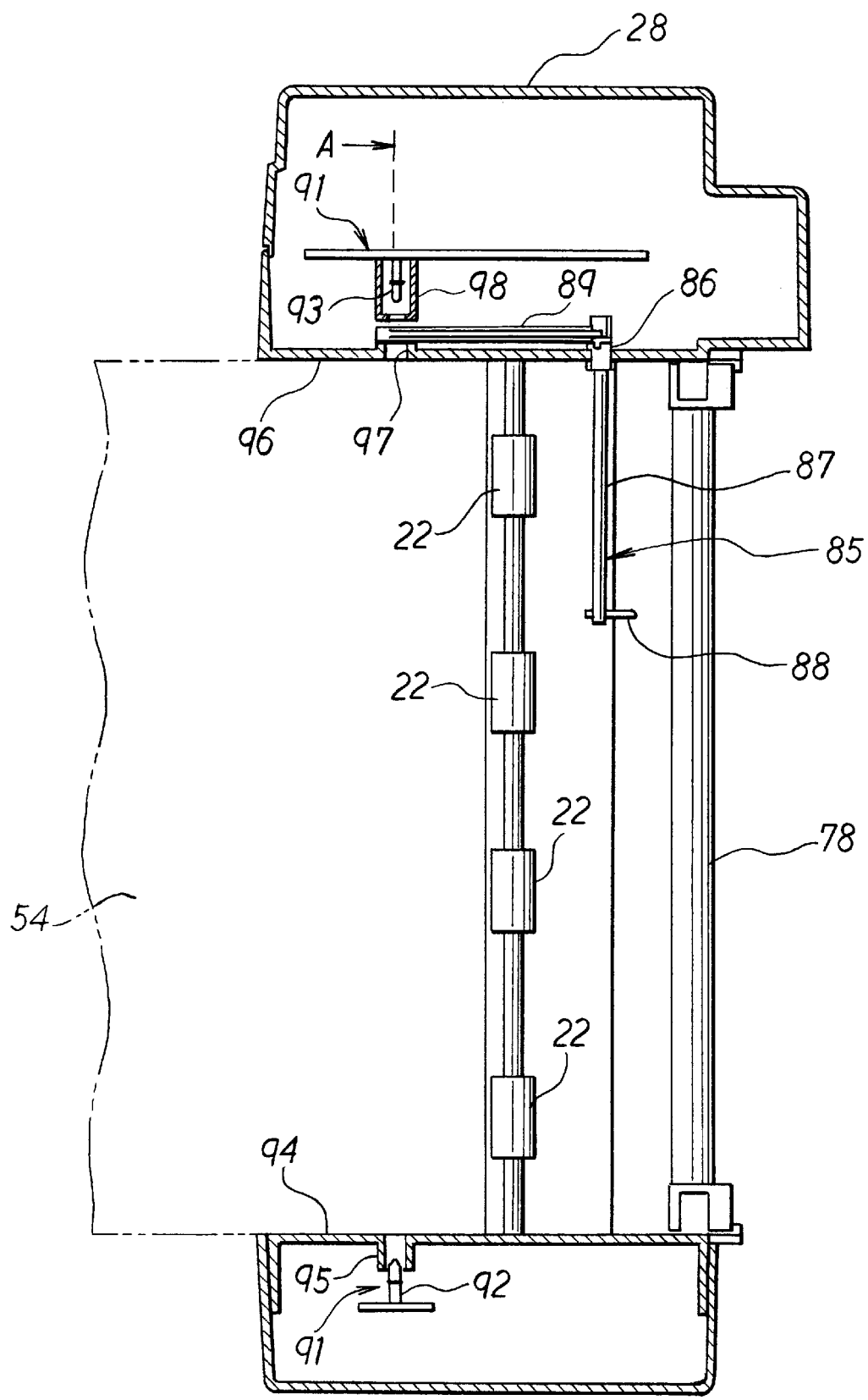
FIG. 12 is a cross-sectional top view similar to FIG. 3, but showing part of a paper sheet discharge apparatus according to another embodiment of the invention.
Figure 13:
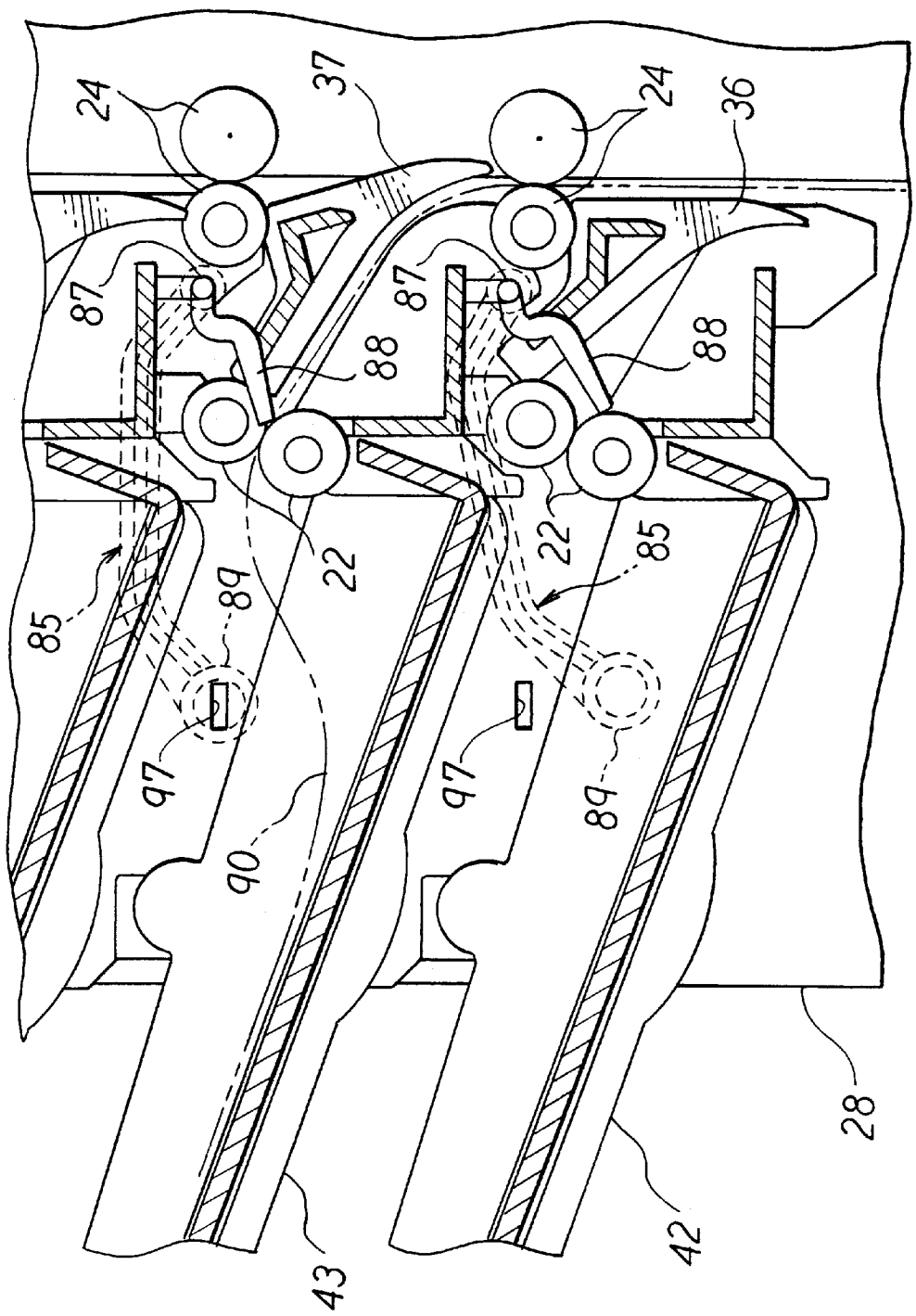
FIG. 13 is a cross-sectional side view of part of the apparatus shown in FIG. 12.

FIGS. 12 and 13 show a paper sheet discharge apparatus according to another embodiment of the invention. In FIG. 12, no bin 23 is shown. The discharge apparatus has a control system as shown in FIG. 8, and is mounted on an image forming apparatus (not shown), which is equivalent to the apparatus 2 shown in FIG. 1 etc.

This apparatus includes level sensors 91 for the respective bins 23. Similarly to the foregoing sensors 57, each sensor 91 is an optical sensor including a light emitter 92 and a light receiver 93, which have a light emitting element and a light receiving element, respectively. The emitter 92 and the receiver 93 are fixed in the upper casing 28 of the apparatus, and located on opposite sides of the associated bin 23. Paper sheets can be discharged between the emitter 92 and the receiver 93, and stacked in the bin 23. The emitter 92 and the receiver 93 are positioned at the full level of the sheets stacked in the bin 23. If the stacked sheets reach the full level, they block off the light emitted from the emitter 92. If the receiver 93 does not receive the light for a predetermined time, the CPU 40 (FIG. 8) detects the full level. The emitters 92 for all the bins 23 are positioned on the left side of the apparatus, and the receivers 93 for the bins are positioned on the right.

As shown in FIG. 12, the light emitters 92 are provided at an inner vertical wall 94 of the upper casing 28. The wall 94 has hollow emission guide cylinders 95 protruding from it into the casing 28. The cylinders 95 are aligned horizontally with the respective emitters 92. The light from each emitter 92 passes through the associated cylinder 95 toward the associated receiver 93. This enables the light to be emitted toward the receiver 93 without scattering.

Figure 14:
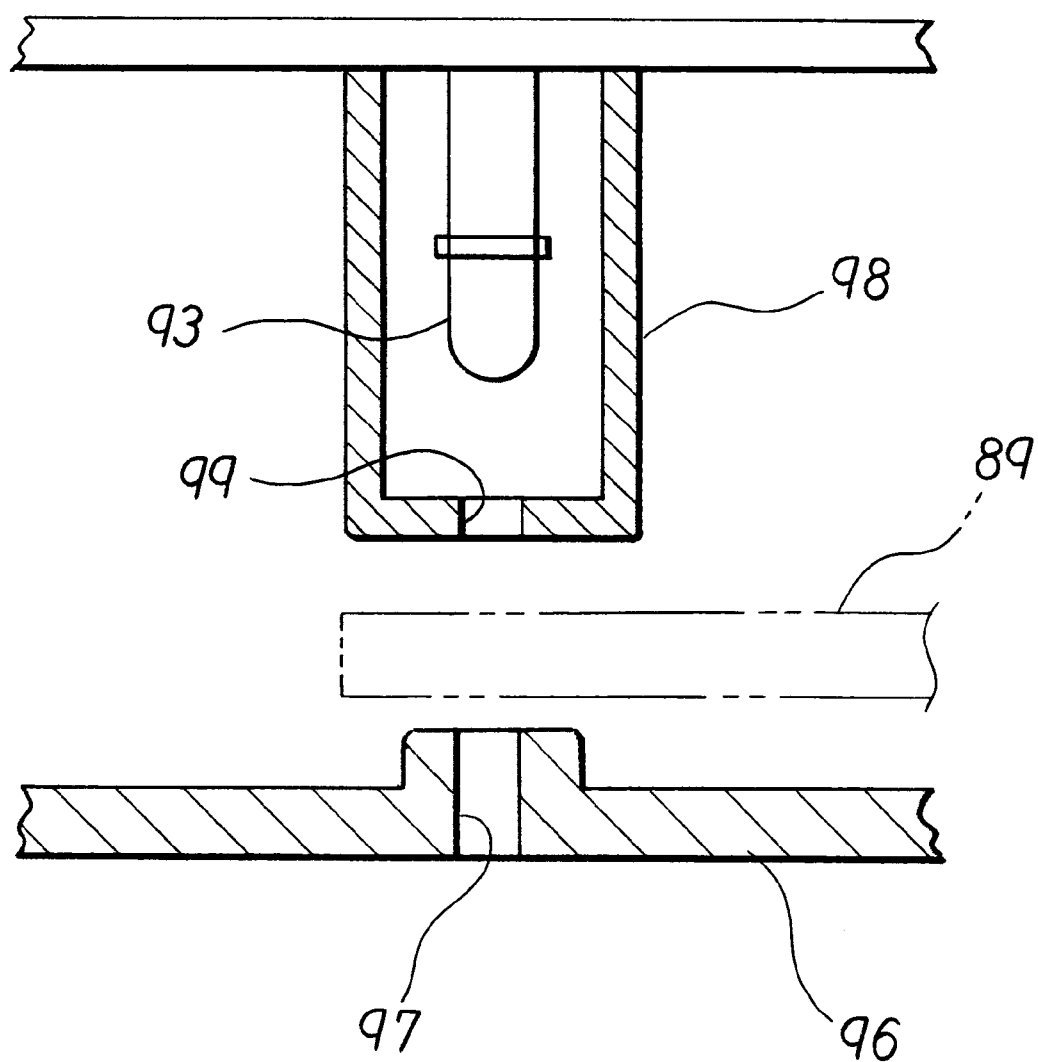
FIG. 14 is a cross-sectional view taken on the line A of FIG. 12.

As shown in FIGS. 12 and 14, the light receivers 93 are provided at another inner vertical wall 96 of the upper casing 28. As shown in FIGS. 12–14, the wall 96 has horizontal slits 97 formed through it as rectangular guides. The slits 97 are aligned horizontally with the respective receivers 93. As best shown in FIG. 14, the wall 96 also has protrusions formed on its inner side, through which the respective slits 97 extend. Each receiver 93 is covered with a cover 98 to be shut off from ambient light. The cover 98 is spaced a little horizontally from the associated slit 97. The cover 98 takes the form of a box, and has a window 99 aligned with the slit 97. The slit 97 and the window 99 have the same shape.

The light from each emitter 92 passes through the slit 97 and window 99 of the associated receiver 93, and is received by the receiver. Because the light from the emitter 92 is guided well to the receiver 93 by the slit 97 and window 99, most of the light received by the receiver 93 is light emitted by the emitter 93. This prevents the receiver 93 from receiving disturbent light. It is therefore possible to improve the accuracy of detection, and prevent erroneous detection of the bin level sensors 91.

This discharge apparatus further includes turners 85 as recording medium contact means or contacting devices for the respective bins 23. When a paper sheet moving toward each bin 23 comes into contact with the associated turner 85, the turner temporarily blocks off the light directed from the associated emitter 92 to the associated receiver 93. The ROM 67 (FIG. 8) stores in it a jamming detection program as a jamming detecting means or detector for detecting a jamming paper sheet in accordance with the operation of each turner 85.

As shown in FIG. 12, each turner 85 is located near the right side of the upper casing 28. As shown in FIGS. 12 and 13, each turner 85 includes a horizontal shaft 87, a contact lever or arm 88 and a blocking lever or arm 89. The shaft 87 is positioned behind the associated delivery rollers 22,78. The shaft 87 extends through and is supported rotatably by a bearing or support 86 formed in the inner wall 96 of the upper casing 28. The contact lever 88 extends forward from the inner end of the shaft 87 so that a paper sheet 90 (two-dot chain line in FIG. 13) moving toward the associated bin 23 comes into contact with this lever. The blocking lever 89 extends forward from the outer end of the shaft 87 so that, when this lever turns, it blocks off the light directed from the associated emitter 92 to the associated receiver 93.

When a paper sheet 90 moving toward each bin 23 comes into contact with the associated contact lever 88, as shown in FIG. 13, this lever is turned together with the associated blocking lever 89 clockwise around the associated shaft 87. The turned blocking lever 89 shuts off the passage of light between the associated slit 97 and window 99.

In FIG. 13, no paper sheet is moving into the second bin 42. The free end of the associated blocking lever 89 is lowered by the weight of the lever. This keeps the associated contact lever 88 crossing the paper discharge passage extending upward to the associated delivery rollers 22,78. In FIG. 13, a paper sheet 90 is moving into the third bin 43. The moving sheet 90 turns the associated contact lever 88 clockwise with the associated blocking lever 89. Until the sheet 90 is discharged into the bin 43, the blocking lever 89 is held in an upper position, where it shuts off the passage of light between the associated slit 97 and window 99. When the sheet 90 has been discharged, the levers 88 and 89 return to lower positions as shown with respect to the second bin 42. Every time a paper sheet is discharged into each bin 23, the associated blocking arm 89 swings to temporarily block off the light directed from the associated emitter 92 to the associated receiver 93.

The execution of the jamming detection program in the ROM 67 (FIG. 8) makes the CPU 40 detect the light blocked off temporarily by each blocking lever 89 swinging. The detection makes it possible to determine whether the discharge of paper sheets is normal, that is, whether a paper sheet is jamming while discharged.

Figure 15:
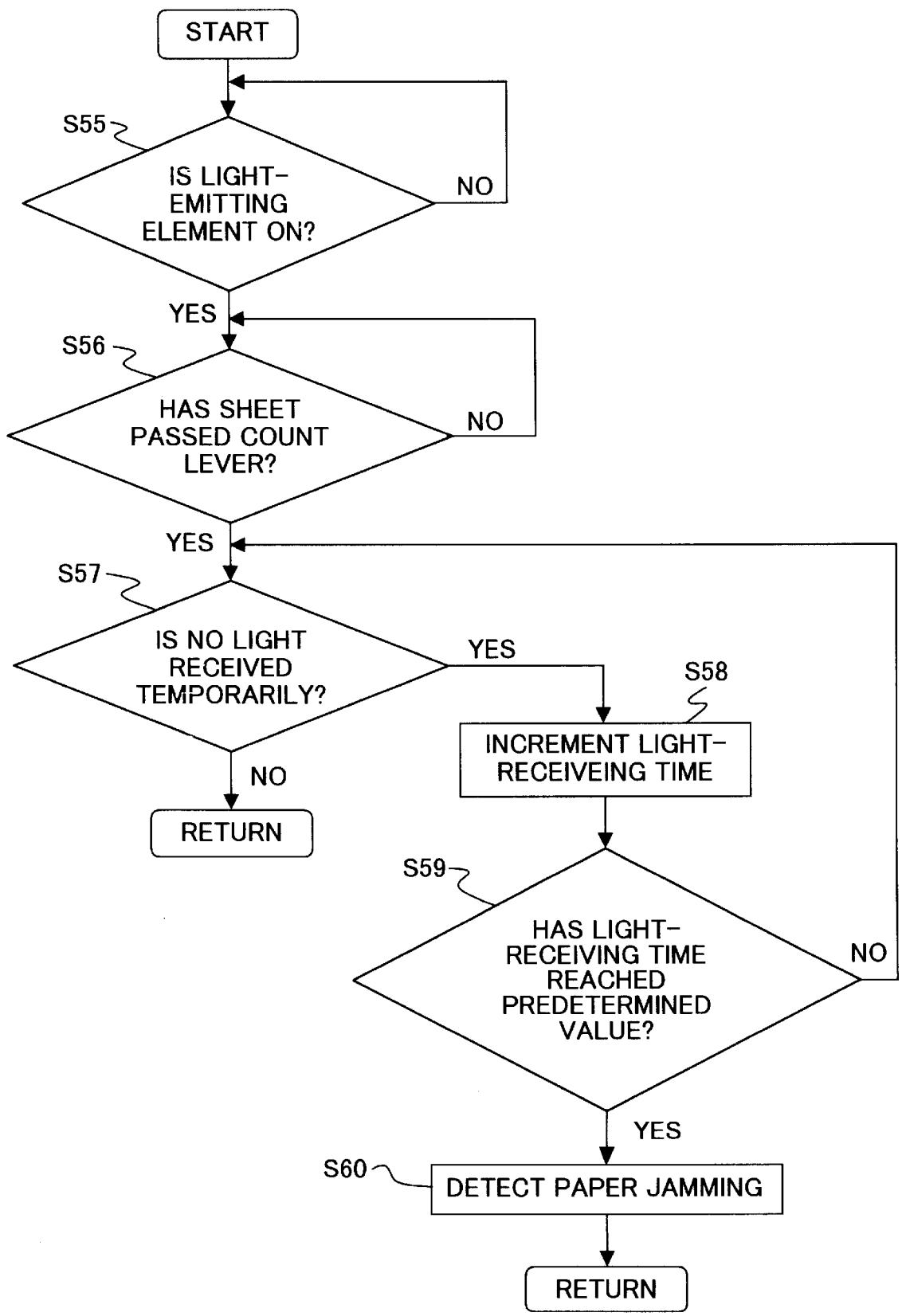
FIG. 15 is a flow chart of the process of a jamming detection program for use with the discharge apparatus shown in FIGS. 12–14.

FIG. 15 shows the process of the jamming detection program. After the process starts, the light emitting elements of the light emitters 92 keep turned on (S55). Next, it is judged whether a paper sheet has passed the count lever 31 (FIG. 2) in the lower casing 29 (S56). If a paper sheet has passed the lever 31, it is judged whether each blocking arm 89 is blocking off the light from the associated emitter 92, and preventing the associated receiver 93 temporarily from receiving the light (S57). If the light is blocked off and is not received temporarily by the receiver 93, the process is returned. If the light is not blocked off but is received by the receiver 93, the receiving time is incremented (S58). Next, it is judged whether the receiving time has reached a predetermined time (S59). The predetermined time is longer than the time which it takes a paper sheet having passed the count lever 31 to reach the delivery rollers 22,78 for the farthest fifth bin 45. If the receiving time has not reached the predetermined time, the process returns to the step S57. If the receiver 93 keeps receiving the light for the predetermined time or longer, it is judged that the discharge apparatus is jammed with a paper sheet (S60). Then, the process is returned.

In accordance with the operation of the count lever 31, it is detected that the introducing passage 21 has received a paper sheet. If the light being received by each receiver 93 is not blocked off by the associated turner 85 for the predetermined time after the detection that the sheet has been introduced into the passage 21, the sheet is judged jamming. This makes it possible to detect jamming reliably by using the simple structure or mechanism.

Thus, every time a paper sheet is discharged, one of the turners 85 may operate. In accordance with the turner operation, the execution of the detection program makes the CPU 40 detect any jamming. Consequently, every time the discharge apparatus discharges a paper sheet, it can be judged whether the sheet is jamming. While the apparatus is discharging paper sheets in order, one or more of them may jam, and the jamming can be detected immediately. It is therefore possible to keep the discharge of paper sheets in good condition.

It is possible to detect both the full level of paper sheets in the bins 23 and jamming in the discharge apparatus by means of the simple structure which includes, in addition to the light emitters 92 and receivers 93, only the turners 85, the jamming detecting program, and an introduction detector such as the count lever 31 provided in advance in the apparatus. It is therefore possible to make the apparatus small and costs low in comparison with a case where a detecting mechanism for detecting jamming is provided independent of the bin level sensors 91.

Figure 16:
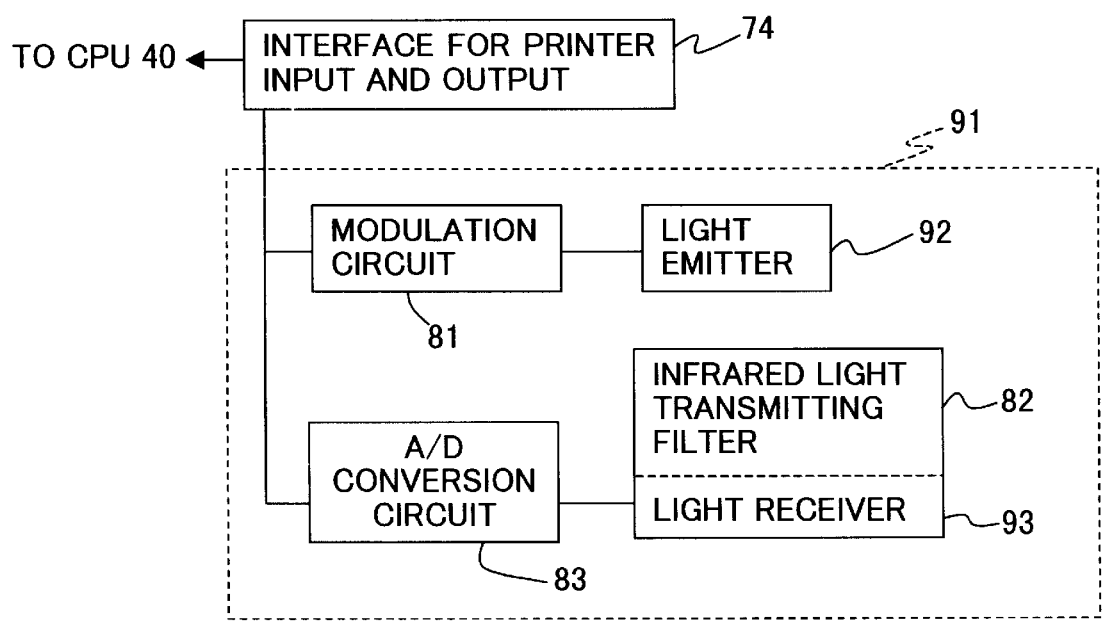
FIG. 16 is a block diagram showing the bin level sensor shown in FIG. 12.

With reference to FIG. 16, the emitter 92 of each bin level sensor 91 emits modulated light, which is received by the associated receiver 93. Each sensor 91 includes a light emitter 92, a modulation circuit 81, a light receiver 93 and an A/D conversion circuit 83.

The emitter 92 includes an infrared light emitting element. The modulator 81 is a light modulating means or modulator for modulating light at a predetermined frequency, which may be a switching frequency of tens of KHz, in accordance with transfer data, which will be mentioned later. The receiver 93 includes a light receiving element fitted with an infrared light transmitting filter 82. The A/D converter 83 is a light modulation detecting means or modulation detector for converting, at a predetermined frequency, the signal output from the receiver 93 into a binary coded signal.

The emitter 92 emits the light modulated at the predetermined frequency by the modulator 81. The receiver 93 receives the modulated light, which is then binary-coded by the A/D converter 83 to be detected. Therefore, the light from the emitter 92 can be detected in distinction from the light from a fluorescent lamp, natural light and/or other disturbent light of a different frequency. This prevents the bin level sensor 91 from making erroneous detection based on disturbent light.

As stated above, each bin level sensor 91 includes a light emitter 92 having an infrared light emitting element, and a light receiver 93 having a light receiving element fitted with an infrared light transmitting filter 82. This prevents visible light components from disturbing the light directed from the emitter 92 to the receiver 93. It is therefore possible to prevent the sensor 91 more securely from making erroneous detection.

Each bin level sensor 91 receives the transfer data for the associated bin 23 from the CPU 40 (FIG. 8) via the interfaces 72 and 74. In accordance with the transfer data, the associated modulator 81 modulates the infrared light for emission from the associated emitter 92.

The modulated infrared light penetrates the filter 82 of the associated receiver 93, and is received by the receiver, which converts it into an electric signal. The associated A/D converter 83 converts the signal into transfer data, which is then output via the interfaces 74 and 72 to the CPU 40. The CPU 40 determines which bin level sensor 91 is associated with the detection signal.

Specifically, for example, the level sensor 91 for the first bin 41 receives from the CPU 40 the transfer data representing this bin. The associated modulator 81 modulates the data. In accordance with the modulated data, the associated emitter 92 emits light. The associated receiver 93 receives the light. The output from the receiver 93 is restored into transfer data by the associated A/D converter 83, which outputs the data via the interfaces 74 and 72 to the CPU 40.

Thus, each bin level sensor 91 emits and receives the light based on the modulated transfer data for the associated bin 23. Consequently, for example, the light emitted by the emitter 92 for the first bin 41 and received by the associated receiver 93 is detected by the CPU 40 in distinction from the light emitted by the emitter 92 for the adjacent second bin 42. The receiver 93 for one of two adjacent bins 23 (for example, second bin 42) may receive the light from the emitter 92 for the other (for example, first bin 41). The received light is distinguished or identified as the light for a wrong bin 23. Therefore, each bin level sensor 91 is not affected by the light from the emitter or emitters 92 of the adjacent sensor or sensors 91. This prevents erroneous detection due to the wrong light.

In order to prevent one of two adjacent bin level sensors 91 from being affected by the light from the other, the emitters 92 of these sensors may emit light at different cycles so as not to emit light at the same time. In this case, the output from each receiver 93 is detected in synchronism with the emission cycles of the associated emitter 92.

The ROM 67 (FIG. 8) stores in it a full level detection program, which can be executed in order for the CPU 40 to detect the full level of paper sheets in each bin 23 with the associated level sensor 91.

Figure 17:
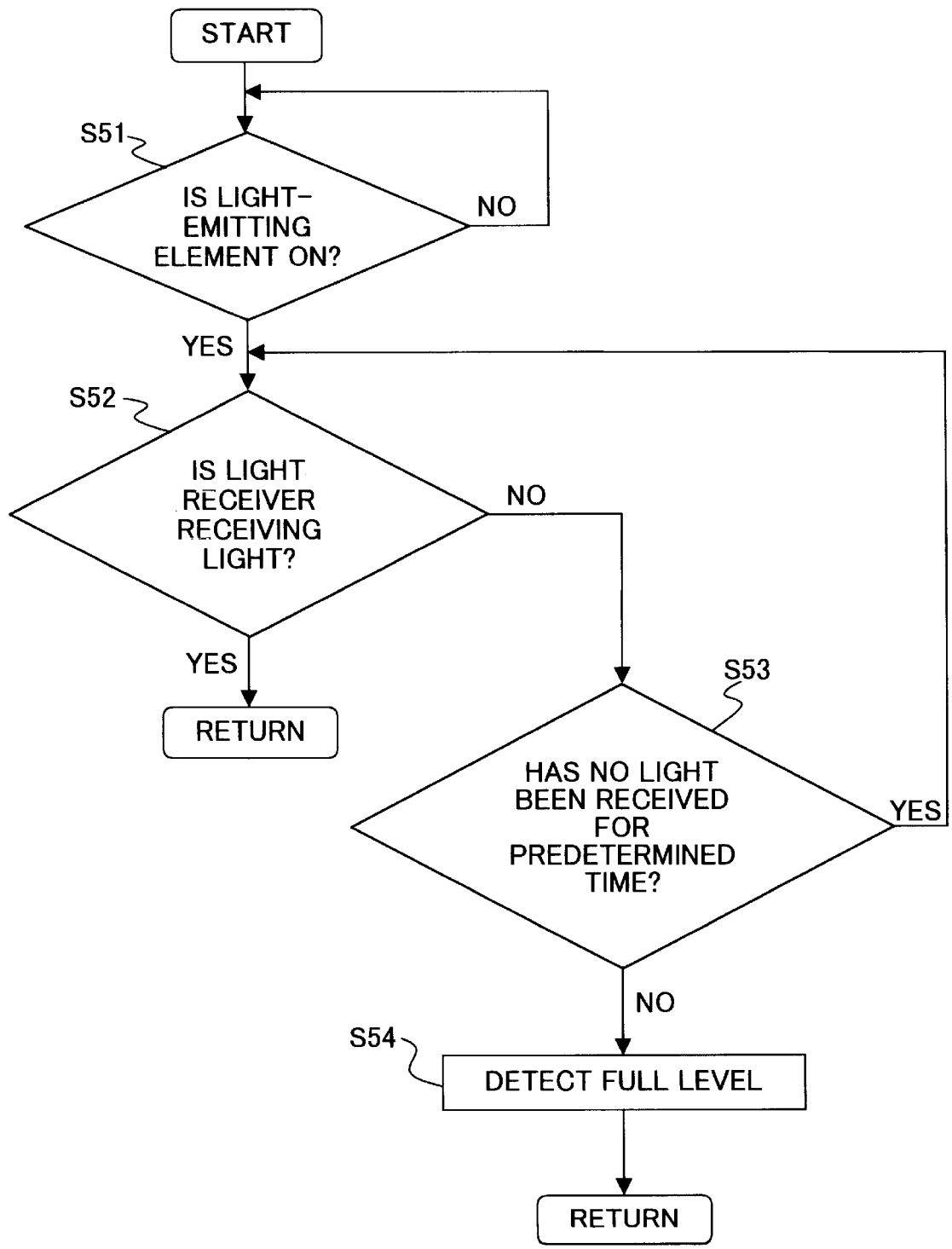
FIG. 17 is a flow chart of the process of a full level detection program for use with the discharge apparatus according to the embodiments.

FIG. 17 shows the process of the full level detection program. After the process starts, the light emitting elements of the light emitters 92 keep turned on (S51). Next, it is judged whether the light from each emitter 92 is received by the associated receiver 93 (S52). If the light is received, the process is returned. If the light is not received, it is judged whether the light has not been received for a predetermined time (S53). The predetermined time is longer than the time which it takes a paper sheet to pass the delivery rollers 22,78 for each bin 23. If the light has been received within the predetermined time, the process returns to the step S52. If the light has not been received within the predetermined time, it is judged that the bin 23 is filled with paper sheets (S54). Then, the process is returned and goes to the process shown in FIG. 9.

After a paper sheet turns each contact lever 88 upward and before the lever returns to its original position, the associated blocking lever 89 temporarily blocks off the light directed from the associated emitter 92 to the associated receiver 93. As stated above, the judgment on the full level is based on the predetermined time longer than the time which it takes a paper sheet to pass the delivery rollers 22,78 for each bin 23. The predetermined time is also longer than the time for which each blocking lever 89 blocks light temporarily. This prevents the CPU 40 from judging the temporary blockage of light to be the full level of paper sheets.

What is claimed is:

1. A recording medium discharge apparatus, comprising:
   an introducing section for receiving recording media on which images are formed;
   a plurality of storing units for storing therein the media received from the introducing section:
      discharging units for discharging to the respective storing units the media received from the introducing section;
      a transporter for transporting to the discharging units the media received from the introducing section;
      transport direction switches for switching a recording medium transport direction to transport selectively to the respective discharging units the media received from the introducing section; and
      storage amount detectors for each detecting a predetermined amount of recording media stored in one of the storing units;

the detectors each including a light emitter for emitting light and a light receiver for receiving the light from the emitter, the emitter and the receiver being provided on opposite sides of the media discharged to the associated storing unit, the emitter and the receiver being positioned along a direction perpendicular to a direction in which the media are discharged to the associated storing unit, wherein the light emitters and receivers of the storage amount detectors are positioned alternately.

2. The recording medium discharge apparatus defined in claim 1, wherein the storing units are mounted removably.

3. An image forming apparatus, comprising:
an image forming unit for forming images on recording media and a recording medium discharge apparatus,
the recording medium discharge apparatus including
an introducing section for receiving the media from the image forming unit;
a plurality of storing units for storing therein the media received from the introducing section, the storing units being detachable from the recording medium discharge apparatus, wherein removal of a storing unit permits storing of a larger capacity of recording media in remaining storing units;
discharging units for discharging to the respective storing units the media received from the introducing section;
a transporter for transporting to the discharging units the media received from the introducing section;
transport direction switches for switching a recording medium transport direction to transport selectively to the respective discharging units the media received from the introducing section;
storage amount detectors for each detecting a predetermined amount of recording media stored in one of the storing units, the detectors each including a light emitter for emitting light and a light receiver for receiving the light from the emitter, the emitter and the receiver being provided on opposite sides of the media discharged to the associated storing unit, the emitter and the receiver being positioned along a direction perpendicular to a direction in which the media are discharged to the storing unit, wherein full level of the one of the storing unit is detectable when the predetermined amount of recording media is stored in the one of the storing units to block off the light emitted from the emitter to the receiver;
recording medium contacting devices for each temporarily blocking off the light from the emitter of one of the storage amount detectors by contacting a recording medium being discharged by the associated discharging unit;
a jamming detector for detecting jamming of recording media in accordance with the operation of the contacting devices; and
an introduction detector for detecting a recording medium received by the introducing section, the jamming detector being adapted to judge that, if the light being received by the light receiver of each storage amount detector is not blocked off by the associated recording medium contacting device for a predetermined time after the introduction detector detects a recording medium while the associated light emitter is lit, the medium is jamming.

4. The image forming apparatus defined in claim 3, wherein each of the storage amount detectors includes a guide for guiding the light from the associated light emitter to the associated light receiver.

5. The image forming apparatus defined in claim 3, wherein each of the storage amount detectors includes a light modulator for modulating light emitted from the associated light emitter and a light modulation detector for detecting the modulated light.

6. The image forming apparatus defined in claim 3, wherein the light emitter emits a light of a wavelength which is longer than a predetermined wavelength, the light receiver receives only the light of the wavelength which is longer than the predetermined wavelength.

7. The image forming apparatus defined in claim 6, wherein the light receiver has an infrared light transmitting filter.

8. A recording medium discharge apparatus, comprising:
an introducing section for receiving recording media on which images are formed;
a plurality of storing units for storing therein the media received from the introducing section, the storing units being detachable from the recording medium discharge apparatus, wherein removal of a storing unit permits storing of a larger capacity of recording media in remaining storing units;
discharging units for discharging to the respective storing units the media received from the introducing section;
a transporter for transporting to the discharging units the media received from the introducing section;
transport direction switches for switching a recording medium transport direction to transport selectively to the respective discharging units the media received from the introducing section; and
storage amount detectors for each detecting a predetermined amount of recording media stored in one of the storing units, the detectors each including a light emitter for emitting light and a light receiver for receiving the light from the emitter, the emitter and the receiver being provided on opposite sides of the media discharged to the associated storing unit, the emitter and the receiver being positioned along a direction perpendicular to a direction in which the media are discharged to the storing unit, wherein full level of the one of the storing unit is detectable when the predetermined amount of recording media is stored in the one of the storing units to block off the light emitted from the emitter to the receiver;
recording medium contacting devices for each temporarily blocking off the light from the light emitter of one of the storage amount detectors by contacting a recording medium being discharged by the associated discharging unit;
a jamming detector for detecting jamming of recording media in accordance with the operation of the contacting devices;
an introduction detector for detecting a recording medium received by the introducing section; and
the jamming detector being adapted to judge that, if the light being received by the light receiver of each storage amount detector is not blocked off by the associated recording medium contacting device for a predetermined time after the introduction detector detects a recording medium while the associated light emitter is lit, the medium is jamming.

9. The recording medium discharge apparatus defined in claim 8, wherein the light emitters and receivers of the storage amount detectors are positioned alternately.

10. The recording medium discharge apparatus defined in claim 8, wherein each of the storage amount detectors includes a guide for guiding the light from the associated light emitter to the associated light receiver.

11. The recording medium discharge apparatus defined in claim 8, wherein each of the storage amount detectors includes a light modulator for modulating light emitted from the associated light emitter and a light modulation detector for detecting the modulated light.

12. The recording medium discharge apparatus defined in claim 11, wherein the light modulator modulates light emitted from the associated light emitter at a predetermined frequency.

13. The recording medium discharge apparatus defined in claim 12, wherein the light emitter emits a light of a wavelength which is longer than a predetermined wavelength, the light receiver receiving only the light of the wavelength which is longer than the predetermined wavelength.

14. A recording medium discharge apparatus, comprising:
    an introducing section for receiving recording media on which images are formed;
    a plurality of detachable storing units for storing therein the media received from the introducing section;
    discharging units for discharging to the respective storing units the media received from the introducing section;
    a transporter for transporting to the discharging units the media received from the introducing section;
    transport direction switches for switching a recording medium transport direction to transport selectively to the respective discharging units the media received from the introducing section; and
    storage amount detectors for each detecting a predetermined amount of recording media stored in one of the storing units;
    the detectors each including a light emitter for emitting light and a light receiver for receiving the light from the emitter, the emitter and the receiver being provided on opposite sides of the media discharged to the associated storing unit, the emitter and the receiver being positioned along a direction perpendicular to a direction in which the media are discharged to the associated storing unit; and
    a control unit for controlling the transport direction-switching units corresponding to each storing unit to switch the transport direction of the paper sheet depending on a detection signal of one of the detectors, wherein the plurality of storing units are aligned in a vertical direction of the casing, and the control unit switches the transport direction-switching units so that the media are successively transported in an order of the storing units aligned from the lowermost storing units toward the uppermost storing units in the associated vertical direction.

15. The recording medium discharge apparatus defined in claim 14, wherein the storing units are mounted removably.

* * * * *